(12) United States Patent
Han et al.

(10) Patent No.: US 12,439,183 B2
(45) Date of Patent: Oct. 7, 2025

(54) RAMP SIGNAL GENERATOR FOR CALIBRATING RAMP LINEARITY, OPERATING METHOD THEREOF, AND IMAGE SENSOR DEVICE INCLUDING THE SAME

(71) Applicant: SAMSUNG ELECTRONICS CO., LTD., Suwon-si (KR)

(72) Inventors: Dongjae Han, Suwon-si (KR); Haneul Jung, Suwon-si (KR); Younghyun Yoon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 203 days.

(21) Appl. No.: 18/141,164

(22) Filed: Apr. 28, 2023

(65) Prior Publication Data

US 2024/0137672 A1 Apr. 25, 2024
US 2024/0236528 A9 Jul. 11, 2024

(30) Foreign Application Priority Data

Oct. 25, 2022 (KR) .................. 10-2022-0138465

(51) Int. Cl.
*H04N 25/78* (2023.01)
*H03K 4/48* (2006.01)
*H04N 25/616* (2023.01)

(52) U.S. Cl.
CPC .............. *H04N 25/78* (2023.01); *H03K 4/48* (2013.01); *H04N 25/616* (2023.01)

(58) Field of Classification Search
CPC ...... H04N 25/78; H04N 25/616; H04N 25/75; H04N 25/766; H03K 4/48
See application file for complete search history.

(56) References Cited

U.S. PATENT DOCUMENTS

| 7,064,699 | B2 | 6/2006 | Sekiguchi |
| 10,819,935 | B2 | 10/2020 | Kim et al. |
| 11,032,505 | B2* | 6/2021 | Kim .................. H04N 25/75 |
| 2019/0335126 | A1* | 10/2019 | Kim .................. H04N 25/772 |

(Continued)

FOREIGN PATENT DOCUMENTS

| KR | 10-0778756 B1 | 11/2007 |
| KR | 10-2009-0080754 A | 7/2009 |
| KR | 10-1836222 B1 | 4/2018 |

(Continued)

*Primary Examiner* — Ahmed A Berhan
(74) *Attorney, Agent, or Firm* — Sughrue Mion, PLLC

(57) ABSTRACT

Disclosed is a ramp signal generator. The ramp signal generator includes: a first unit current source including first sub-unit current sources, and configured to output a first unit current during a first time period; and a second unit current source including second sub-unit current sources, and configured to output a second unit current during a second time period. The first sub-unit current sources are configured to operate according to first sub-ramp control signals, respectively. The second sub-unit current sources are configured to operate according to second sub-ramp control signals, respectively. n first sub-ramp control signals among the first sub-ramp control signals are activated, and m sub-ramp control signals among the second sub-ramp control signals are activated, n and m being different natural numbers.

20 Claims, 17 Drawing Sheets

(56) References Cited

U.S. PATENT DOCUMENTS

2021/0358077 A1   11/2021   Song et al.
2022/0173745 A1   6/2022    Kim

FOREIGN PATENT DOCUMENTS

| KR | 10-2019-0123501 A | 11/2019 |
| KR | 10-2019-0125746 A | 11/2019 |
| KR | 10-2021-0141161 A | 11/2021 |

* cited by examiner

FIG. 9B

|  | P1 | P2 | P3 | P4 |
|---|---|---|---|---|
| |SLPa| | <|SLP_Ideal| | <|SLP_Ideal| | ≒|SLP_Ideal| | >|SLP_Ideal| |
| SA1 | SUB1_1~SUB1_K Activate | - | - | - |
| SA2 | - | SUB2_1~SUB2_K Activate | - | - |
| SA3 | - | - | SUB3_1~SUB3_M Activate | - |
| SA4 | - | - | - | SUB4_1~SUB4_J Activate |
| Magnitude of unit current | < I | > I | ≒ I | < I |
| INL of RS | ≒ 0 | ≒ 0 | ≒ 0 | ≒ 0 |

FIG. 10B

|  | P1 | P2 | P3 |
|---|---|---|---|
| \|SLPb\| | <\|SLP_Ideal\| | Infection Point Exist | <\|SLP_Ideal\| |
| SA1 | SUB1_1~SUB1_K Activate | - | - |
| SA2 | - | SUB2_1~SUB2_M Activate | - |
| SA3 | - | - | SUB3_1~SUB3_K Activate |
| Magnitude of unit current | > I | ≒ I | > I |
| INL of RS | ≒ 0 | ≒ 0 | ≒ 0 |

FIG. 11B

|  | P1 | P2 | P3 | P4 |
|---|---|---|---|---|
| \|SLPa\| | >\|SLP_Ideal\| | ≒\|SLP_Ideal\| | <\|SLP_Ideal\| | <\|SLP_Ideal\| |
| SA1 | SUB1_1~SUB1_J Activate | - | - | - |
| SA2 | - | SUB2_1~SUB2_M Activate | - | - |
| SA3 | - | - | SUB3_1~SUB3_K Activate | - |
| SA4 | - | - | - | SUB4_1~SUB4_K Activate |
| Magnitude of unit current | < I | ≒ I | > I | > I |
| INL of RS | ≒ 0 | ≒ 0 | ≒ 0 | ≒ 0 |

RAMP SIGNAL GENERATOR FOR CALIBRATING RAMP LINEARITY, OPERATING METHOD THEREOF, AND IMAGE SENSOR DEVICE INCLUDING THE SAME

CROSS-REFERENCE TO RELATED APPLICATION

This application claims priority to Korean Patent Application No. 10-2022-0138465, filed on Oct. 25, 2022, in the Korean Intellectual Property Office, the disclosure of which is incorporated by reference herein in its entirety.

BACKGROUND

The present disclosure relates to a ramp signal generator, and more particularly, relate to a ramp signal generator for calibrating ramp linearity, an operating method thereof, and an image sensor device including the same.

An image sensor may be included in an electronic device, such as a smartphone, a tablet personal computer (PC), or a digital camera. The image sensor may obtain image information about an external object by converting a light reflected or emitted from the external object into an electrical signal. Various image signal processing operations may be performed to convert an electrical signal obtained from the image sensor into image information perceivable by a person and to improve the quality of image.

The image sensor may include a correlated double sampling (CDS) circuit, which operates based on a ramp signal. Because the CDS circuit operates based on the ramp signal, when the ramp signal decreases non-linearly, the probability that an error occurs in an operation of the CDS circuit may increase. Therefore, there is a need to improve the linearity of the ramp signal.

SUMMARY

Embodiments provide a ramp signal generator for calibrating ramp linearity, an operating method thereof, and an image sensor device including the same.

According to an aspect of an embodiment, a ramp signal generator including: a first unit current source including a plurality of first sub-unit current sources, and configured to output a first unit current during a first time period; and a second unit current source including a plurality of second sub-unit current sources, and configured to output a second unit current during a second time period. The plurality of first sub-unit current sources are configured to operate according to a plurality of first sub-ramp control signals, respectively. The plurality of second sub-unit current sources are configured to operate according to a plurality of second sub-ramp control signals, respectively. n first sub-ramp control signals among the plurality of first sub-ramp control signals are activated, and m sub-ramp control signals among the plurality of second sub-ramp control signals are activated, n and m being different natural numbers.

According to an aspect of an embodiment, an image sensor device includes: a pixel array configured to output pixel signals corresponding to an image; a ramp signal generator configured to output a ramp signal; an analog-to-digital converter configured to receive the pixel signals from the pixel array and to receive the ramp signal from the ramp signal generator; and a sensor controller configured to control the ramp signal generator, and to generate a plurality of first sub-ramp control signals and a plurality of second sub-ramp control signals. The ramp signal generator includes: a first unit current source including a plurality of first sub-unit current sources, and configured to output a first unit current during a first time period; and a second unit current source including a plurality of second sub-unit current sources, and configured to output a second unit current during a second time period. The plurality of first sub-unit current sources are configured to operate according to the plurality of first sub-ramp control signals, respectively. The plurality of second sub-unit current sources are configured to operate according to the plurality of second sub-ramp control signals, respectively. n first sub-ramp control signals among the plurality of first sub-ramp control signals are activated, and m sub-ramp control signals among the plurality of second sub-ramp control signals are activated, n and m being different natural numbers.

According to an aspect of an embodiment, a ramp signal generator includes: a first unit current source configured to output a first unit current during a first time period; and a second unit current source configured to output a second unit current during a second time period. The ramp signal generator is configured to generate a ramp signal having a voltage level that changes from a first value to a second value. A magnitude of the first unit current and a magnitude of the second unit current are different from each other. The magnitude of the first unit current is identical to a magnitude of a unit current for generating a target ramp signal during the first time period. The magnitude of the second unit current is identical to the magnitude of the unit current for generating the target ramp signal during the second time period. The target ramp signal has a voltage level that changes linearly from the first value to the second value.

BRIEF DESCRIPTION OF DRAWINGS

The above and other aspects and features of the present disclosure will be more clearly understood from the following description of embodiments, taken in conjunction with the accompanying drawings, in which:

FIG. 9B is a table for describing a ramp signal calibration operation of FIG. 9A.

FIG. 10B is a table for describing a ramp signal calibration operation of FIG. 10A.

FIG. 11B is a table for describing a graph of FIG. 11A.

DETAILED DESCRIPTION

Below, embodiments will be described with reference to the accompanying drawings. Embodiments described herein are provided as examples, and thus, the present disclosure is not limited thereto, and may be realized in various other forms. Each embodiment provided in the following description is not excluded from being associated with one or more features of another example or another embodiment also provided herein or not provided herein but consistent with the present disclosure. In the description below, terms, such as "block", "unit", "module", etc., or components corresponding to the terms, may be implemented in the form of software, hardware, or a combination thereof.

Figure 1:
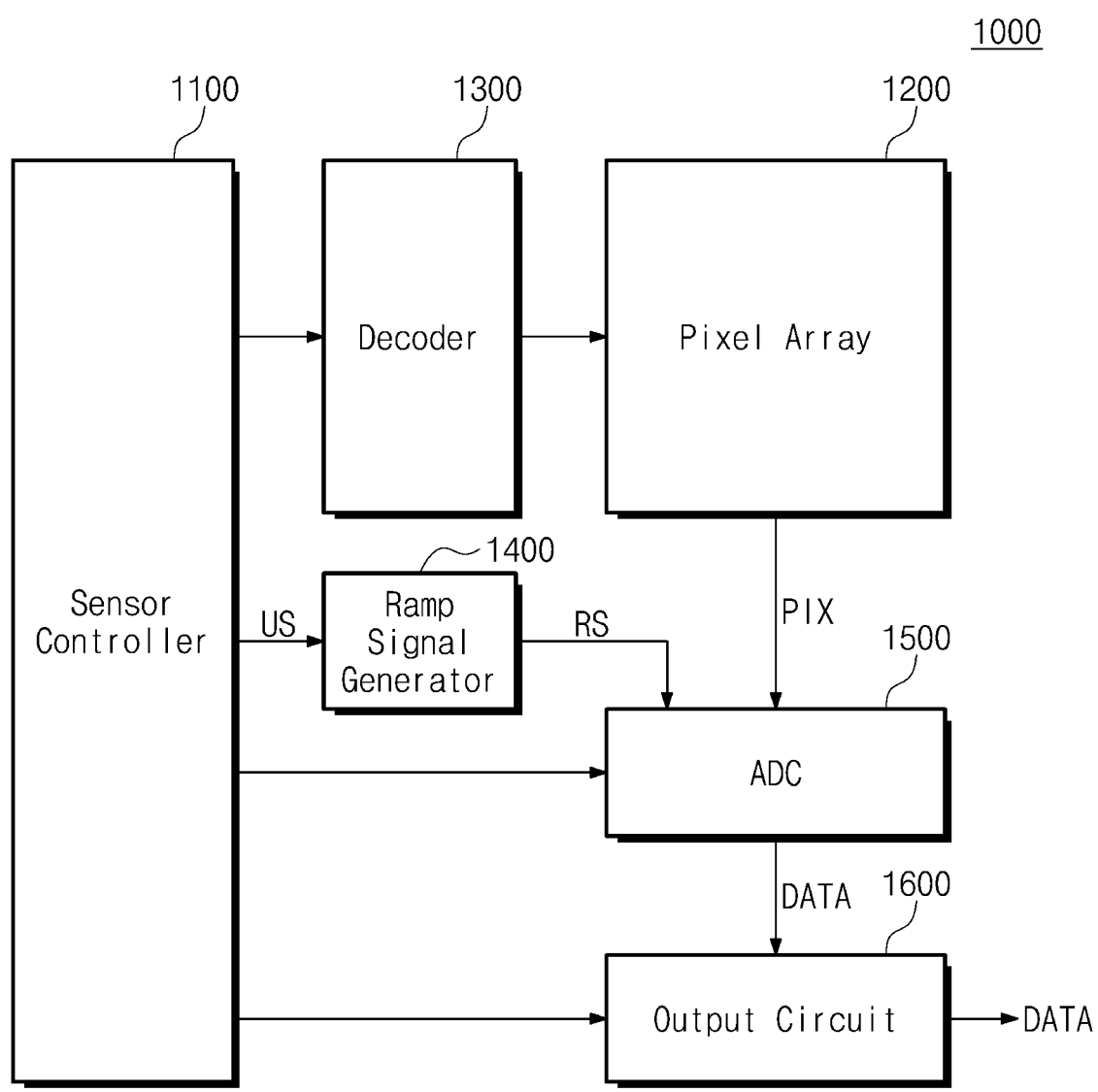
FIG. 1 is a block diagram illustrating an image sensor according to an embodiment.

FIG. 1 is a block diagram illustrating an image sensor according to an embodiment. An image sensor 1000 may output image data based on a light from the outside. Referring to FIG. 1, the image sensor 1000 may include a sensor controller 1100, a pixel array 1200, a decoder 1300, a ramp signal generator 1400, an analog-to-digital converter (ADC) 1500, and an output circuit 1600.

The sensor controller 1100 may be configured to control various components in the image sensor 1000.

The pixel array 1200 may include a plurality of image pixels (e.g., pixels) arranged in a row direction and a column direction. Each of the plurality of image pixels may generate a pixel signal PIX under control of the decoder 1300. The pixel signal PIX may be an electrical signal, which is proportional to the intensity of light incident from the outside, that is, an analog signal, based on the incident light. According to an embodiment, to identify lights of different wavelengths, the plurality of image pixels may be combined with different color filters (e.g., R, G, and B color filters). According to an embodiment, the color filters combined with the plurality of image pixels may form a color filter array (CFA). The color filter array may be formed based on at least one of various patterns such as a Bayer pattern and a tetra pattern.

The decoder 1300 may be connected with the pixel array 1200 through a plurality of signal lines. The decoder 1300 may provide a transfer signal TX, a reset signal RX, and a selection signal SEL to each of the plurality of image pixels through the plurality of signal lines.

The ramp signal generator 1400 may receive a ramp control signal US from the sensor controller 1100. The ramp signal generator 1400 may generate a ramp signal RS based on the ramp control signal US. The ramp signal RS may refer to a signal that increases or decreases linearly during a specific period. That is, the ramp signal RS may refer to a signal that increases or decreases depending on a given slope.

The ADC 1500 may convert an analog signal formed from each of the plurality of image pixels into a digital signal and may output the converted digital signal as data "DATA". The image sensor 1000 may further include a storage circuit or a memory configured to store the data "DATA" output from the ADC 1500.

According to an embodiment, the ADC 1500 may include a correlated double sampling (CDS) circuit. As such, the ADC 1500 may output the digital signal as the data "DATA" based on the correlated double sampling. That is, the ADC 1500 may remove an offset component present in the signal by sampling a signal value based on a reference value.

According to an embodiment, the ADC 1500 may receive the ramp signal RS from the ramp signal generator 1400 and may receive the pixel signal PIX from the pixel array 1200. The ADC 1500 may convert an analog signal into a digital signal based on the ramp signal RS and the pixel signal PIX. For example, the ADC 1500 may include a comparator.

The output circuit 1600 may transfer the digital signal DATA output from the ADC 1500 to an external device (e.g., a display or a storage device).

Figure 2:
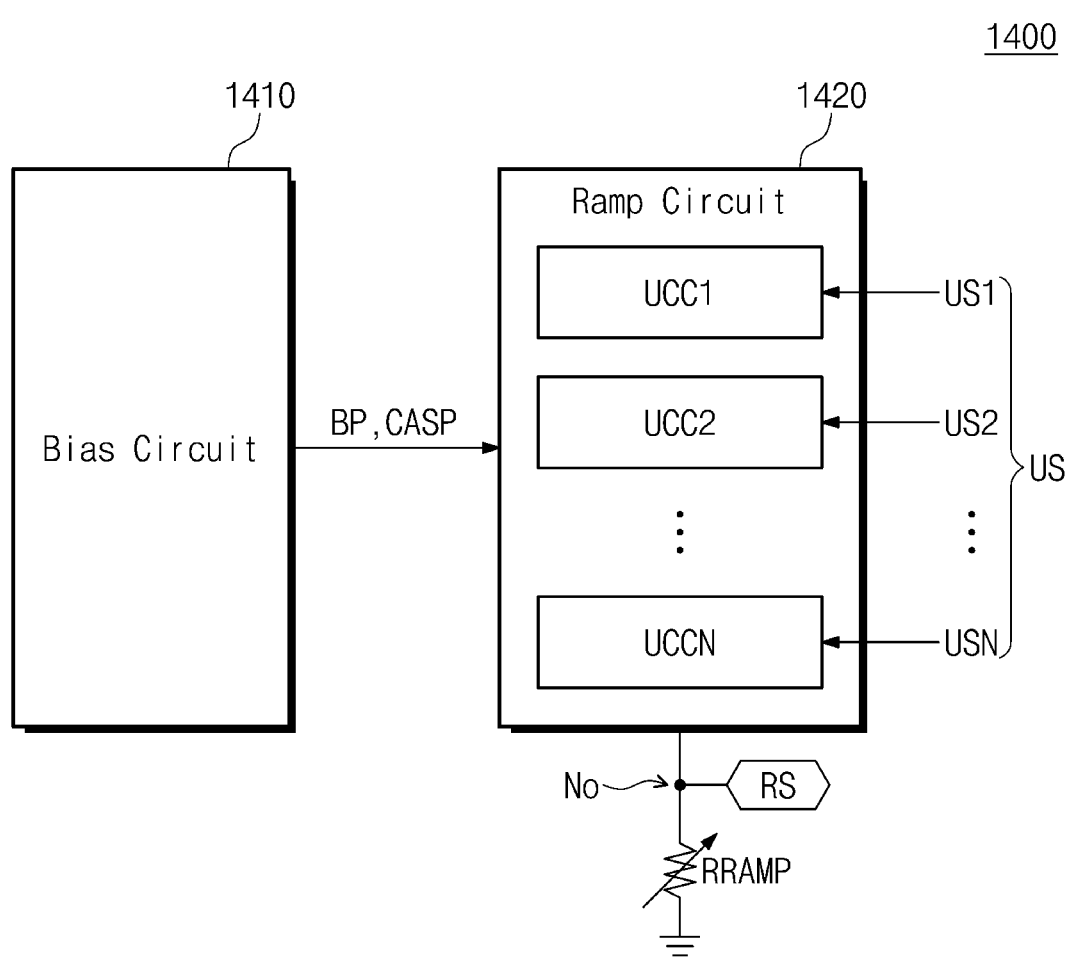
FIG. 2 is a block diagram of a ramp signal generator according to an embodiment.

FIG. 2 is a block diagram of a ramp signal generator according to an embodiment. Referring to FIG. 2, the ramp signal generator 1400 may include a bias circuit 1410, a ramp circuit 1420, and a ramp resistor RRAMP.

The ramp circuit 1420 may generate unit currents I1 to IN based on first and second bias signals BP and CASP and the ramp control signal US during a ramp period from a first time point and a second time point. The unit currents I1 to IN flowing through an output node No may be based on the ramp signal RS. The ramp circuit 1420 may receive the first and second bias signals BP and CASP from the bias circuit 1410. The ramp circuit 1420 may receive the ramp control signal US from the sensor controller 1100. The ramp control signal US may include a plurality of ramp control signals US1 to USN.

The ramp circuit 1420 may include a plurality of unit current sources UCC1 to UCCN. The plurality of unit current sources UCC1 to UCCN may receive the first and second bias signals BP and CASP and may operate in response to the ramp control signals US1 to USN, respectively.

For example, the first unit current source UCC1 may generate a first unit current in response to the first ramp control signal US1. The second unit current source UCC2 may generate a second unit current in response to the second ramp control signal US2. The N-th unit current source UCCN may generate an N-th unit current in response to the N-th ramp control signal USN. The first to N-th unit currents may flow through the output node No. The ramp signal generator 1400 may generate the ramp signal RS based on the first to N-th unit currents. The generation of the ramp signal RS will be described in detail later.

The ramp resistor RRAMP may be connected with the ramp circuit 1420 through the output node No. The ramp resistor RRAMP may be connected between the output node No and a ground node receiving a ground voltage. The ramp resistor RRAMP may be a variable resistor. In an embodiment, the slope of the ramp signal RS may be determined based on a magnitude (or a resistance value) of the ramp resistor RRAMP.

Figure 3:
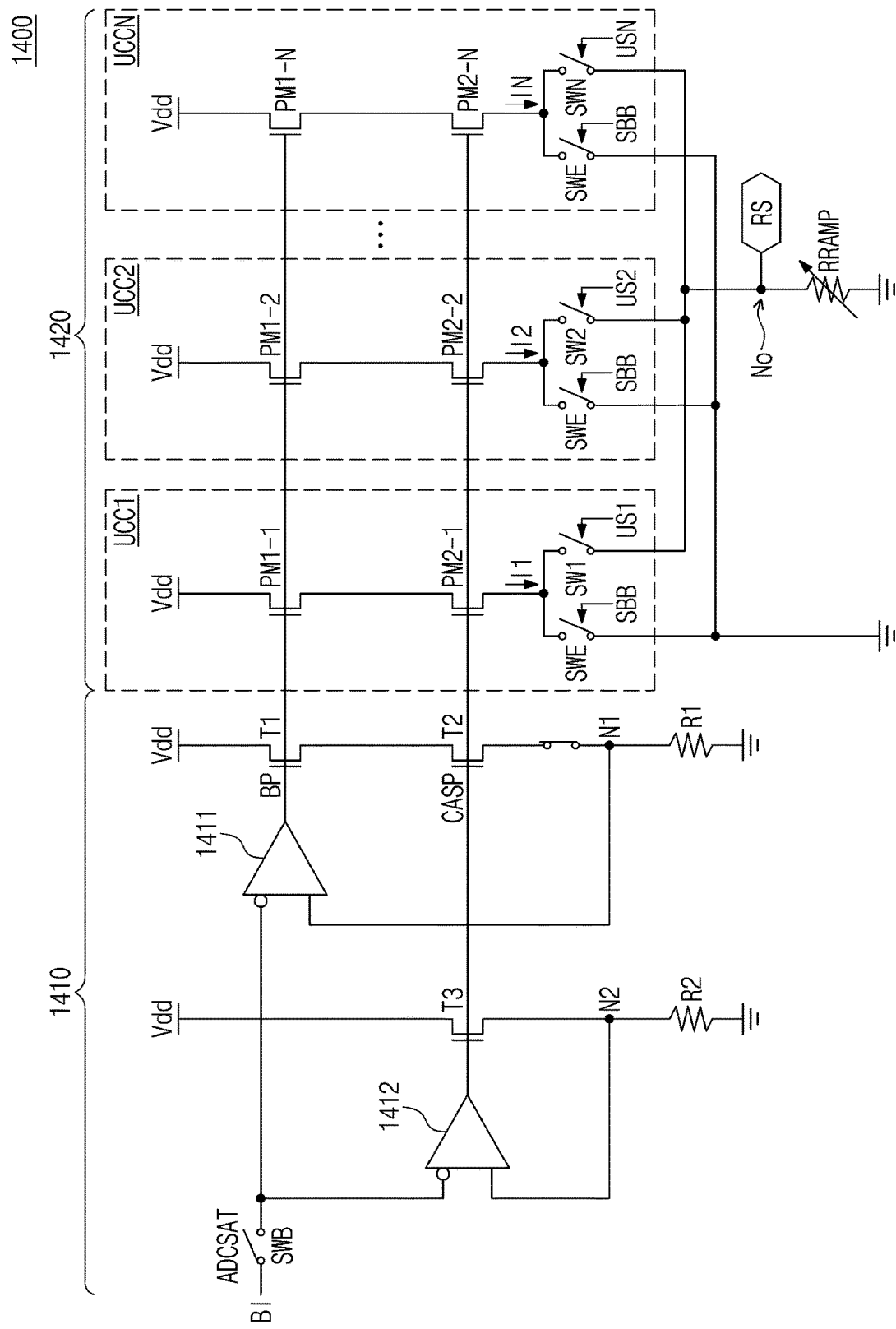
FIG. 3 is a circuit diagram illustrating a ramp signal generator.

FIG. 3 is a circuit diagram illustrating a ramp signal generator. The ramp signal generator 1400 in which the bias circuit 1410 and the ramp circuit 1420 are implemented at a transistor level is illustrated in FIG. 3.

The bias circuit 1410 includes a bias switch SWB, a first operational amplifier (OP AMP) device 1411, a second OP AMP device 1412, a plurality of transistors T1 to T3, and a plurality of resistors R1 and R2. Each of the first OP AMP device 1411 and the second OP AMP device 1412 may include a first input terminal and a second input terminal. The bias circuit 1410 may receive a bias generation signal ADCSAT and an input signal BI from the outside. The bias switch SWB may be turned on in response to the activated bias generation signal ADCSAT. An inverter may be connected to the first input terminals. As such, an inverted version of the input signal BI may be input to first input terminals of the first OP AMP device 1411 and the second OP AMP device 1412.

A second input terminal of the first OP AMP device 1411 may be connected with a first node N1. A second input terminal of the second OP AMP device 1412 may be connected with a second node N2. The first OP AMP device 1411 may output first bias signal BP based on the inverted version of the input signal BI and a voltage of the first node N1. The second OP AMP device 1412 may output second bias signal CASP based on the inverted version of the input signal BI and a voltage of the second node N2.

For example, a voltage of the first bias signal BP may be controlled by the first transistor T1, the second transistor T2, and the first resistor R1. A voltage of the second bias signal CASP may be controlled by the third transistor T3 and the second resistor R2.

The ramp circuit 1420 may include the plurality of unit current sources UCC1 to UCCN. Each of the plurality of unit current sources UCC1 to UCCN may include a plurality of transistors, a ramp switch, and a ramp end switch SWE. For example, the first unit current source UCC1 may include first and second p-channel metal oxide semiconductor (PMOS) transistors PM1-1, PM2-1, a first ramp switch SW1, and the ramp end switch SWE.

For example, the first PMOS transistor PM1-1 and the second PMOS transistor PM2-1 included in the first unit current source UCC1 may be connected in series between a power node of receiving a power supply voltage and a connection node of the first ramp switch SW1 and the ramp end switch SWE. The first ramp switch SW1 may be connected between the second PMOS transistor PM2-1 and the output node No, through which the ramp signal RS is output. The ramp end switch SWE may be connected between the second PMOS transistor PM2-1 and the ground node.

The first PMOS transistor PM1-1 may be turned on in response to the first bias signal BP of logic low. The second PMOS transistor PM2-1 may be turned on in response to the second bias signal CASP of logic low. As such, the first unit current source UCC1 may generate the first unit current I1 based on a ramp end signal SBB and the first ramp control signal US1. The magnitude of the first unit current I1 may be controlled depending on magnitudes of the first and second bias signals BP and CASP. As noted above, each of the plurality of unit current sources UCC1 to UCCN may be implemented with PMOS transistors. However, the present disclosure is not limited thereto. Each of the plurality of unit current sources UCC1 to UCCN may be implemented with n-channel metal oxide semiconductor (NMOS) transistors.

The ramp signal generator 1400 may output the ramp signal RS in response to the first to N-th ramp control signals US1 to USN and the ramp end signal SBB. For example, the ramp end switch SWE included in each of the first to N-th unit current sources UCC1 to UCCN may be turned on according to the ramp end signal SBB. In this case, the first to N-th unit currents I1 to IN may flow to the ground node regardless of the first to N-th ramp control signals US1 to USN. That is, when the ramp end switches SWE are turned on, the ramp signal generator 1400 may not generate the ramp signal RS.

For example, the ramp end switches SWE may be in a turn-off state in response to the deactivated ramp end signal SBB, and the first to N-th ramp switches SW1 to SWN may be in a turn-on state in response to the activated ramp control signals US1 to USN. In this case, the first to N-th unit current sources UCC1 to UCCN may be connected with the output node No. As such, the first to N-th unit currents I1 to IN may flow to the ramp resistor RRAMP through the output node No. Below, that a unit current source is turned on or turned off means that a ramp switch is turned on or turned off by the activation or deactivation of a ramp control signal that the turned-on or turned-off unit current source receives. However, the present disclosure is not limited thereto.

The ramp signal generator 1400 may output the ramp signal RS based on a sum of unit currents flowing through the output node No and the ramp resistor RRAMP. The voltage level of the ramp signal RS may be determined based on the number of unit currents flowing to the ramp resistor RRAMP through the output node No and a magnitude of each of the unit currents.

The ramp signal generator 1400 may control a magnitude of a current flowing through the output node No based on the ramp end signal SBB and the first to N-th ramp control signals US1 to USN. In this regard, the ramp signal generator 1400 may control the number of ramp switches to be turned on, based on the number of ramp control signals activated from among the first to N-th ramp control signals US1 to USN. As such, the ramp signal generator 1400 may control the voltage level of the ramp signal RS.

Referring to FIG. 3, the first unit current source UCC1 may include the first transistor PM1-1 and the second transistor PM2-1. The second unit current source UCC2 may include a second transistor PM1-2 and a second transistor PM2-2. The Nth unit current source UCCN may include a second transistor PM1-N and a second transistor PM2-N.

For example, the first transistor PM1-1 included in the first unit current source UCC1 and the first transistor PM1-2 included in the second unit current source UCC2 may be substantially similar transistors. The second transistor PM2-1 included in the first unit current source UCC1 and the second transistor PM2-2 included in the second unit current source UCC2 may be substantially similar transistors. As such, in an ideal case, a magnitude of the first unit current I1 output by the first unit current source UCC1 may be equal to a magnitude of the second unit current I2 output by the second unit current source UCC2. However, in a real world implementation, the magnitude of the first unit current I1 output by the first unit current source UCC1 and the magnitude of the second unit current I2 output by the second unit current source UCC2 may be different from each other due to the process mismatch. That is, in a real world implementation, each of the plurality of unit current sources UCC1 to UCCN may not operate as a fixed current source that outputs the same unit current. As such, magnitudes of the unit currents I1 to IN output by the plurality of unit current sources UCC1 to UCCN may be different from each other.

Figure 4:
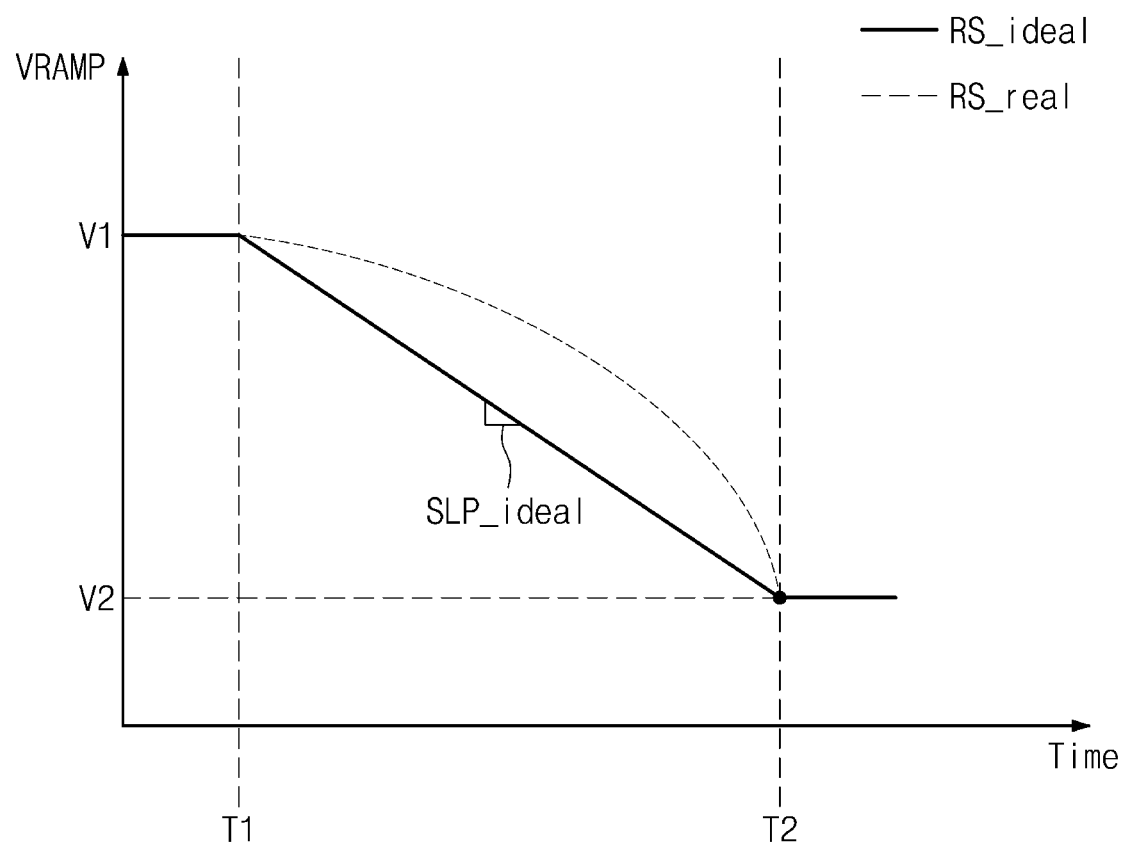
FIG. 4 is a graph for describing a ramp signal generated by a ramp signal generator of FIG. 3.

FIG. 4 is a graph for describing a ramp signal generated by a ramp signal generator of FIG. 3. In FIG. 4, a vertical axis represents a voltage level, and a horizontal axis represents time. Referring to FIGS. 3 and 4, the sensor controller 1100 may sequentially deactivate the first to N-th ramp control signals US1 to USN during an operation period from T1 to T2. As such the plurality of unit current sources UCC1 to UCCN may be sequentially turned off during the operation period from T1 to T2. In this case, the number of unit currents flowing to the ramp resistor RRAMP through the output node No may sequentially decrease. As such, the ramp signal generator 1400 may generate the ramp signal RS whose voltage level decreases. As a clock signal CLK toggles, the first to N-th ramp control signals US1 to USN may be sequentially deactivated.

In an ideal case, the unit currents I1 to IN that the plurality of unit current sources UCC1 to UCCN respectively output may have the same magnitude. This may mean that the voltage level of the ramp signal RS linearly decreases during the operation period from T1 to T2.

However, as described above, the magnitudes of the unit currents I1 to IN that the plurality of unit current sources UCC1 to UCCN respectively output may be different from each other due to the process mismatch. This may mean that the voltage level of the ramp signal RS non-linearly decreases during the operation period from T1 to T2. As such, the probability that an error occurs in the operation of the ADC 1500 may increase. Therefore, there is a need to improve the linearity of the ramp signal. Below, like the ideal case, a ramp signal whose voltage level linearly decreases is referred to as a "target ramp signal".

Unlike the ramp signal generator of FIG. 4, each of a plurality of unit current sources (e.g., UCC1 to UCCN) included in the ramp signal generator 1400 according to an embodiment includes a plurality of sub-unit current sources. The ramp signal generator 1400 may control the number of sub-unit currents constituting a unit current. As such, the ramp signal generator 1400 may adjust a magnitude of a unit current that each unit current source outputs. In this regard, according to an embodiment, a ramp signal generator that generates a ramp signal with improved linearity by adjusting a magnitude of a unit current that each unit current source outputs and an image sensor including the same are provided. A ramp signal generator according to an embodiment will be described in detail with reference to the following drawings.

Figure 5:
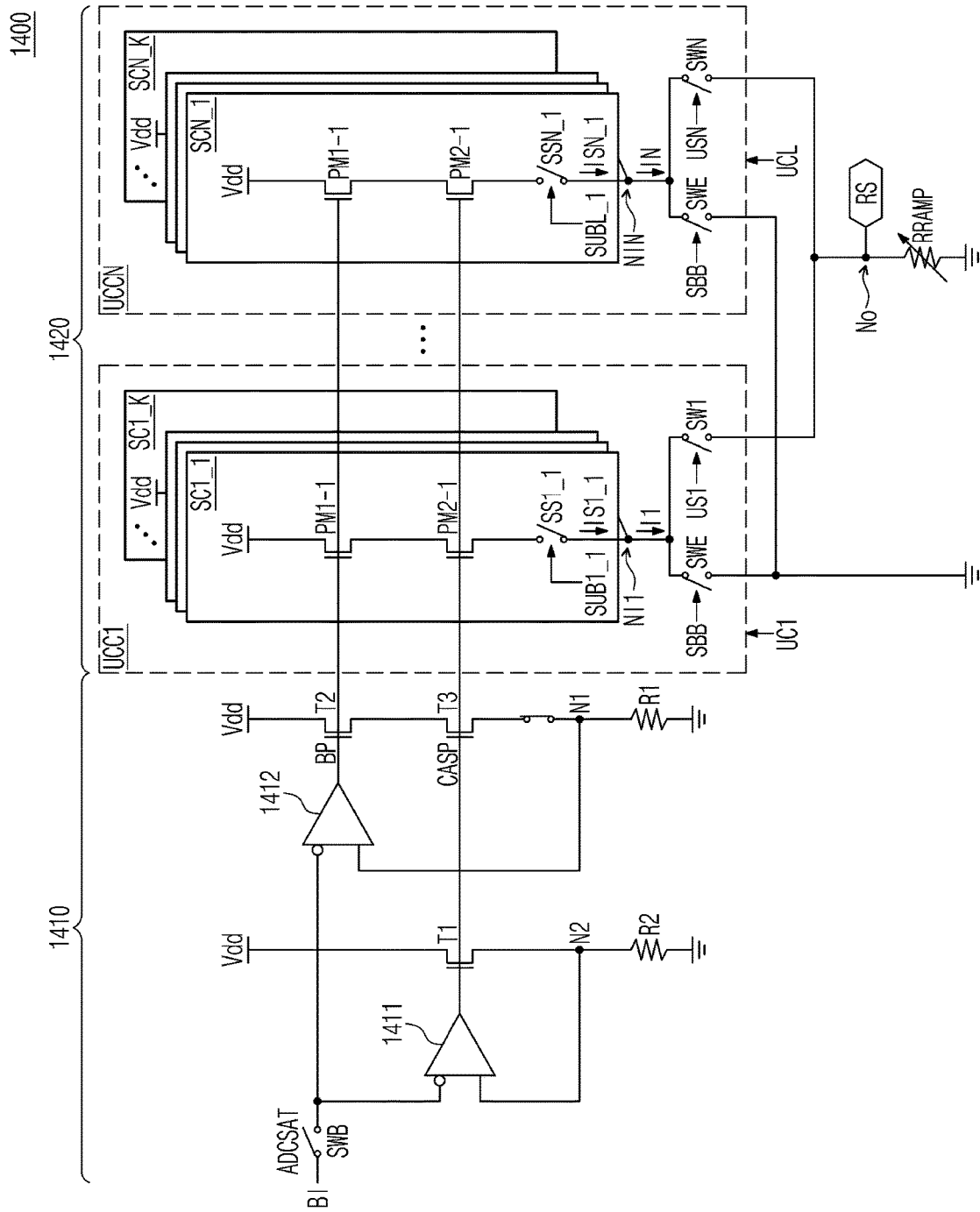
FIG. 5 is a circuit diagram of a ramp signal generator implemented according to an embodiment.

FIG. 5 is a circuit diagram of a ramp signal generator implemented according to an embodiment. The ramp signal generator 1400 in which the bias circuit 1410 and the ramp circuit 1420 are implemented at a transistor level is illustrated in FIG. 5. For convenience of description, additional description associated with the components described above will be omitted to avoid redundancy.

According to an embodiment, each of the plurality of unit current sources UCC1 to UCCN may include a plurality of sub-unit current sources (e.g., SC1_1 to SCN_K). For example, the first unit current source UCC1 may include first to K-th sub-unit current sources SC1_1 to SC1_K. For example, the N-th unit current source UCCN may include first to K-th sub-unit current sources SCN_1 to SCN_K.

Each of the plurality of sub-unit current sources SC1_1 to SCN_K may include the first and second PMOS transistors PM1-1 and PM2-1 and a sub-ramp switch (e.g., SS1_1). For example, the first and second PMOS transistors PM1-1 and PM2-1 included in the first sub-unit current source SC1_1 that belongs to the first unit current source UCC1 may be connected in series between the power node of receiving the power supply voltage and the first sub-ramp switch SS1_1. For example, the first sub-ramp switch SS1_1 included in the first unit current source UCC1 may be connected between the second PMOS transistor PM2-1 and a first unit current output node NIL The bias circuit 1410 may output the first and second bias signals BP and CASP to each sub-unit current source. Each of the plurality of sub-unit current sources (e.g., SC1_1 to SCN_K) may operate based on the first and second bias signals BP and CASP. An operation in which the bias circuit 1410 outputs the first and second bias signals BP and CASP is substantially similar to that described with reference to FIG. 3.

For example, the first PMOS transistor PM1-1 included in the first sub-unit current source SC1_1 that belongs to the first unit current source UCC1 may be turned on in response to the first bias signal BP of logic low, and the second PMOS transistor PM2-1 included therein may be turned on in response to the second bias signal CASP of logic low. As noted above, each of the sub-unit current sources (e.g., SC1_1 to SCN_K) may be implemented with PMOS transistors. However, the present disclosure is not limited thereto. Each of the sub-unit current sources (e.g., SC1_1 to SCN_K) may be implemented with NMOS transistors.

The plurality of unit current sources UCC1 to UCCN may respectively receive unit current control signals UC1 to UCL from the sensor controller 1100. Each of the unit current control signals UC1 to UCL may include first to K-th sub-ramp control signals. For example, the first unit current control signal UC1 may include first to K-th sub-ramp control signals SUB1_1 to SUB1_K. For example, the L-th unit current control signal UCL may include first to K-th sub-ramp control signals SUBL_1 to SUBL_K.

Each of sub-ramp switches (e.g., SS1_1) may be turned on in response to an activated sub-ramp control signal (e.g., SUB1_1). Each of the sub-ramp switches (e.g., SS1_1) may be turned off in response to a deactivated sub-ramp control signal (e.g., SUB1_1). Below, that a sub-unit current source is turned on or turned off means that a sub-ramp switch included in the turned-on or turned-off sub-unit current source is turned on or turned off. However, the present disclosure is not limited thereto.

For example, the first and second PMOS transistors PM1-1 and PM2-1 included in the first sub-unit current source SC1_1 of the first unit current source UCC1 may be in the turn-on state, and the first sub-ramp switch SUB1_1 included therein may be in the turn-on state. In this case, the first sub-unit current source SC1_1 may generate a first sub-unit current IS1_1.

For example, a plurality of sub-unit currents IS1_1 to IS1_K that the plurality of sub-unit current sources SC1_1 to SC1_K of the first unit current source UCC1 output may flow to the first unit current output node NIL The plurality of sub-unit currents IS1_1 to IS1_K flowing through the first unit current output node NH may constitute the first unit current IL The ramp signal generator 1400 may control the number of sub-unit currents IS1_1 to IS1_N constituting each unit current, based on the number of sub-ramp control signals activated from among sub-ramp control signals included in each of the plurality of unit current control signals UC1 to UCL. As such, the ramp signal generator 1400 may control magnitudes of the unit currents I1~IN.

According to an embodiment, the first to N-th ramp switches SW1 to SWN may be sequentially turned off based on the first to N-th ramp control signals US1 to USN. As such, a magnitude of a current flowing to the ramp resistor RRAMP through the output node No may decrease. In this regard, the ramp signal generator 1400 generates the ramp signal RS whose voltage level decreases. However, the present disclosure is not limited thereto. For example, the first to N-th ramp switches SW1 to SWN may be sequentially turned on based on the first to N-th ramp control signals US1 to USN. Thus, the ramp signal generator 1400 may generate the ramp signal RS whose voltage level increases. That is, the ramp signal generator 1400 according to the present disclosure may generate the ramp signal RS whose voltage level increases or decreases, by sequentially turning on or turning off a plurality of unit current sources.

According to an embodiment, the ramp end switches SWE respectively included in the plurality of unit current sources UCC1 to UCCN may be turned on based on the ramp end signal SBB. In this case, a plurality of unit currents (e.g., I1 to IN) may flow to the ground node, not the output node No. This may mean that the ramp signal generator 1400 does not generate the ramp signal RS.

Figure 6:
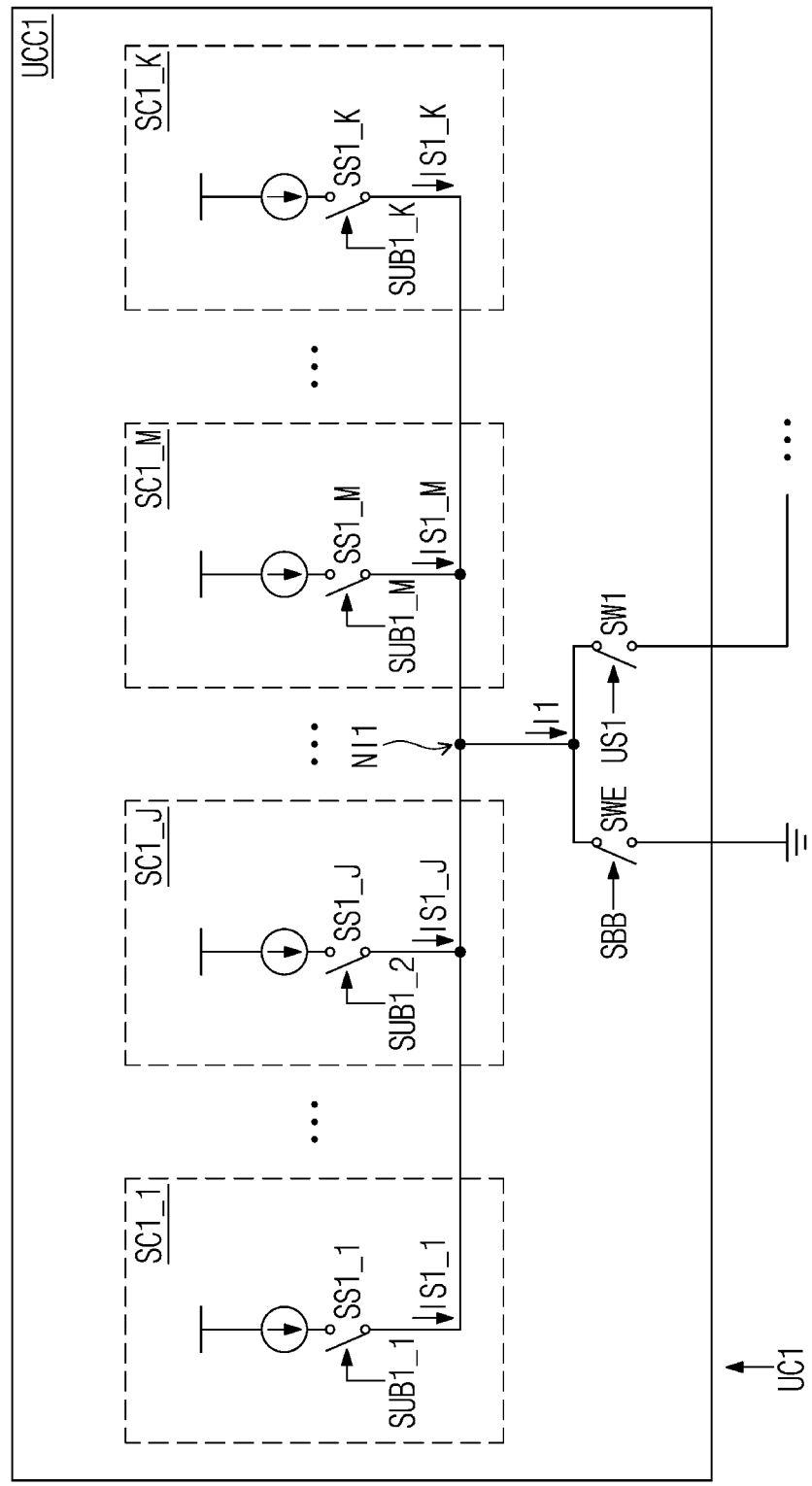
FIG. 6 is a diagram illustrating an example of a unit current source included in a ramp signal generator of FIG. 5.

FIG. 6 is a diagram illustrating an example of a unit current source included in a ramp signal generator of FIG. 5. FIG. 6 will be described in detail with reference to FIG. 5. For convenience of description, additional description associated with the components described above will be omitted to avoid redundancy. For convenience of description, below, the first unit current source UCC1 will be described in detail.

According to an embodiment, the first unit current source UCC1 may receive the first unit current control signal UC1. The first unit current control signal UC1 may include the first to K-th sub-ramp control signals SUB1_1 to SUB1_K. The first to K-th sub-unit current sources may respectively receive the first to K-th sub-ramp control signals SUB1_1 to SUB1_K.

According to an embodiment, the first unit current I1 may include first to K-th sub-unit currents IS1_1 to IS1_K (K being a natural number greater than "1"). According to an embodiment, in an ideal case, two or more sub-unit currents among the first to K-th sub-unit currents IS1_1 to IS1_K may have different magnitudes. According to an embodiment, in an ideal case, the first to K-th sub-unit currents IS1_1 to IS1_K may have the same magnitude. Below, for convenience of description, the description will be given under the condition that the first to K-th sub-unit currents IS1_1 to IS1_K have the same magnitude ideally.

According to an embodiment, the ramp signal generator 1400 may turn on only the first to M-th sub-unit current sources SC1_1 to SC1_M (M being a natural number smaller than K) based on the first to M-th sub-ramp control signals SUB1_1 to SUB1_M being activated, and thus, the first unit current I1 may correspond to a sum of the first to M-th sub-unit currents IS1_1 to IS1_M. The magnitude of the first unit current I1 may be smaller than the magnitude of the unit current for generating the target ramp signal. As such, the ramp signal RS may be a non-linear signal. The ramp signal generator 1400 may turn on all the first to K-th sub-unit current sources SC1_1 to SC1_K based on the first unit current control signal UC1. To this end, the first to K-th sub-ramp control signals SUB1_1 to SUB1_K may be activated. In this case, the first unit current I1 may correspond to the sum of the first to K-th sub-unit currents IS1_1 to IS1_K. That is, the ramp signal generator 1400 may increase the magnitude of the first unit current I1.

According to an embodiment, the ramp signal generator 1400 may turn on only the first to M-th sub-unit current sources SC1_1 to SC1_M based on the first to M-th sub-ramp control signals SUB1_1 to SUB1_M being activated, and thus, the first unit current I1 may correspond to the sum of the first to M-th sub-unit currents IS1_1 to IS1_M. The magnitude of the first unit current I1 may be greater than the magnitude of the unit current for generating the target ramp signal. As such, the ramp signal RS may be a nonlinear signal. In this case, the ramp signal generator 1400 may turn on only the first to J-th sub-unit current sources SC1_1 to SC1_J (J being a natural number smaller than M), based on the first unit current control signal UC1. To this end, only the first to J-th sub-ramp control signals SUB1_1 to SUB1_J may be activated. As such, the first unit current I1 may correspond to a sum of the first to J-th sub-unit currents IS1_1 to IS1_J. That is, the ramp signal generator 1400 may decrease the magnitude of the first unit current I1.

For example, the number (e.g., M, J, or K) of sub-ramp control signals activated from among the first to K-th sub-ramp control signals SUB1_1 to SUB1_K may be determined based on the target ramp signal.

As described above, the ramp signal generator 1400 according to an embodiment may increase or decrease the magnitude of the unit current unlike the ramp signal generator illustrated in FIG. 3. That is, the ramp signal generator 1400 according to an embodiment may control magnitudes of unit currents bi-directionally. Accordingly, the ramp signal generator 1400 may improve the linearity of the ramp signal.

Figure 7:
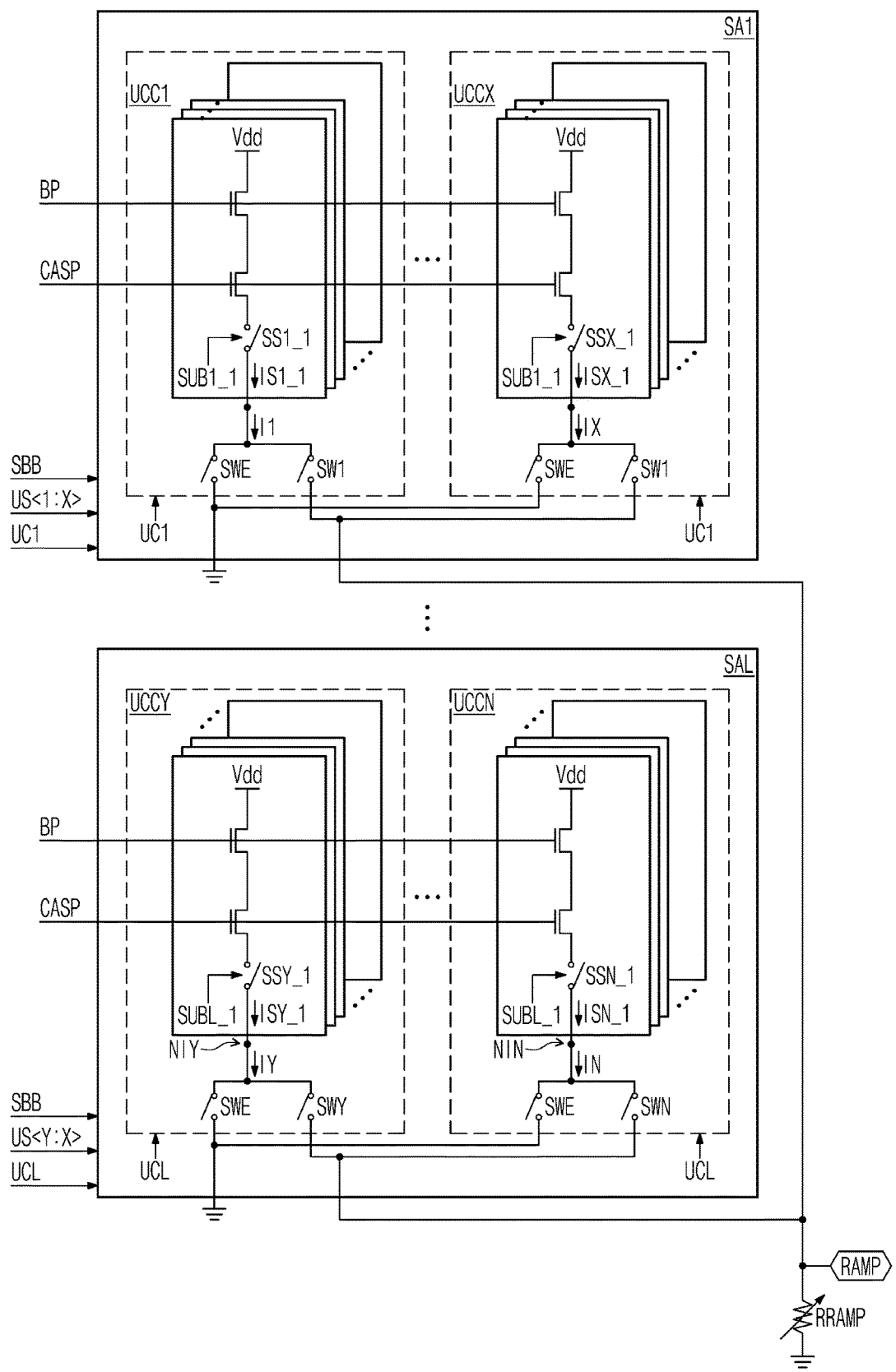
FIG. 7 is a diagram for describing an operation of a ramp signal generator according to an embodiment.

FIG. 7 is a diagram for describing an operation of a ramp signal generator according to an embodiment. For convenience of description, additional description associated with the components described above will be omitted to avoid redundancy. According to an embodiment, the ramp signal generator 1400 may include first to L-th unit current source arrays SA1 to SAL. Each of the first to L-th unit current source arrays SA1 to SAL may include a plurality of unit current sources. For example, each of the first to L-th unit current source arrays SA1 to SAL may include the same number of unit current sources. In this case, the ramp signal generator 1400 may include the first to L-th unit current source arrays SA1 to SAL that are implemented by dividing the plurality of unit current sources UCC1 to UCCN by "L".

The first to L-th unit current source arrays SA1 to SAL may receive the first to L-th unit current control signals UC1 to UCL respectively corresponding to the unit current source arrays SA1 to SAL. In this case, the plurality of unit current sources included in each unit current source array may receive the same unit current control signal.

For example, the first unit current source array SA1 may receive the first unit current control signal UC1. Accordingly, first to X-th unit current sources UCC1 to UCCX included in the first unit current source array SA1 may receive the first unit current control signal UC1. For example, Y-th to N-th unit current sources UCCY to UCCN included in the L-th unit current source array SAL may receive the L-th unit current control signal UCL. That is, the ramp signal generator 1400 may control the magnitude of the unit current for each of the unit current source arrays SA1 to SAL, based on the number of sub-ramp control signals activated from among a plurality of ramp control signals (e.g., SUB1_1 to SUB1_K) included in each of the unit current control signals UC1 to UCL.

Figure 8:
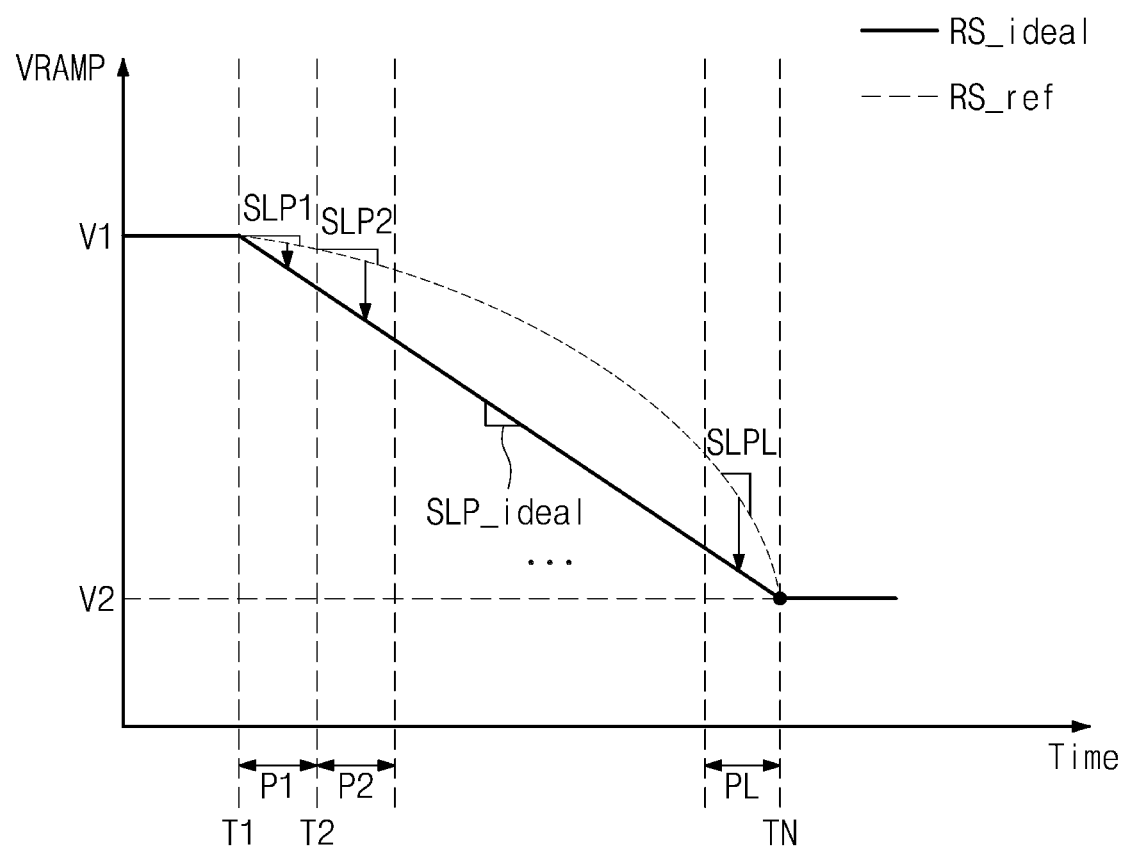
FIG. 8 is a graph illustrating an example of a ramp signal output from a ramp signal generator according to an embodiment.

FIG. 8 is a graph illustrating an example of a ramp signal output from a ramp signal generator according to an embodiment. In FIG. 8, a horizontal axis represents time, and a vertical axis represents a voltage of the ramp signal RS. A solid line indicates a waveform of a target ramp signal RS_ideal, and a dashed line indicates a waveform of a reference ramp signal RS_ref. FIG. 8 will be described with reference to FIGS. 5 to 7.

According to an embodiment, during an operation period from T1 to TN, the ramp signal generator 1400 may sequentially turn off the plurality of unit current sources UCC1 to UCCN based on the ramp control signals US1 to USN. The ramp signal generator 1400 may generate an output ramp signal RS whose voltage changes from a first value V1 to a second value V2.

According to an embodiment, the reference ramp signal RS_ref may refer to a signal that is generated when only first to M-th sub-ramp control signals (e.g., SUB1_1 to SUB1_M) are activated among the first to K-th sub-ramp control signals (e.g., SUB1_1 to SUB1_K) included in each of the plurality of unit current control signals UC1 to UCL. For example, the waveform of the reference ramp signal RS_ref may be shown by a dashed line.

Referring to FIGS. 7 and 8, the ramp signal RS may include a plurality of sub-operation periods P1 to PL. For example, the ramp signal generator 1400 may generate the ramp signal RS of the first sub-operation period P1 by sequentially turning off the first to X-th unit current sources UCC1 to UCCX included in the first unit current source array SA1. That is, the number of sub-operation periods P1 to PL may be determined based on the number of unit current source arrays SA1 to SAL.

Referring to FIG. 7, the unit current control signals UC1 to UCL that are respectively input to the unit current source arrays SA1 to SAL may be different from each other. As such, the ramp signal generator 1400 may control a magnitude of a unit current output from a unit current source, for each of the sub-operation periods P1 to PL.

For example, only the first to M-th sub-ramp control signals SUB1_1 to SUB1_M among the first to K-th sub-ramp control signals SUB1_1 to SUB1_K included in the first unit current control signal UC1 may be activated. In this case, each of the first to X-th unit currents I1 to IX may correspond to a sum of the first to M-th sub-unit currents.

For example, all of the first to K-th sub-ramp control signals SUBL_1 to SUBL_K included in the L-th unit current control signal UCL may be activated. In this case, each of the Y-th to N-th unit currents IY to IN may correspond to a sum of the first to K-th sub-unit currents.

The ramp signal generator 1400 may calibrate the slope of the ramp signal RS for each of the sub-operation periods P1 to PL, by independently controlling the unit current control signals UC1 to UCL respectively input to the unit current source arrays SA1 to SAL. Calibration of a slope of a ramp signal will be described in detail.

Figure 9A:
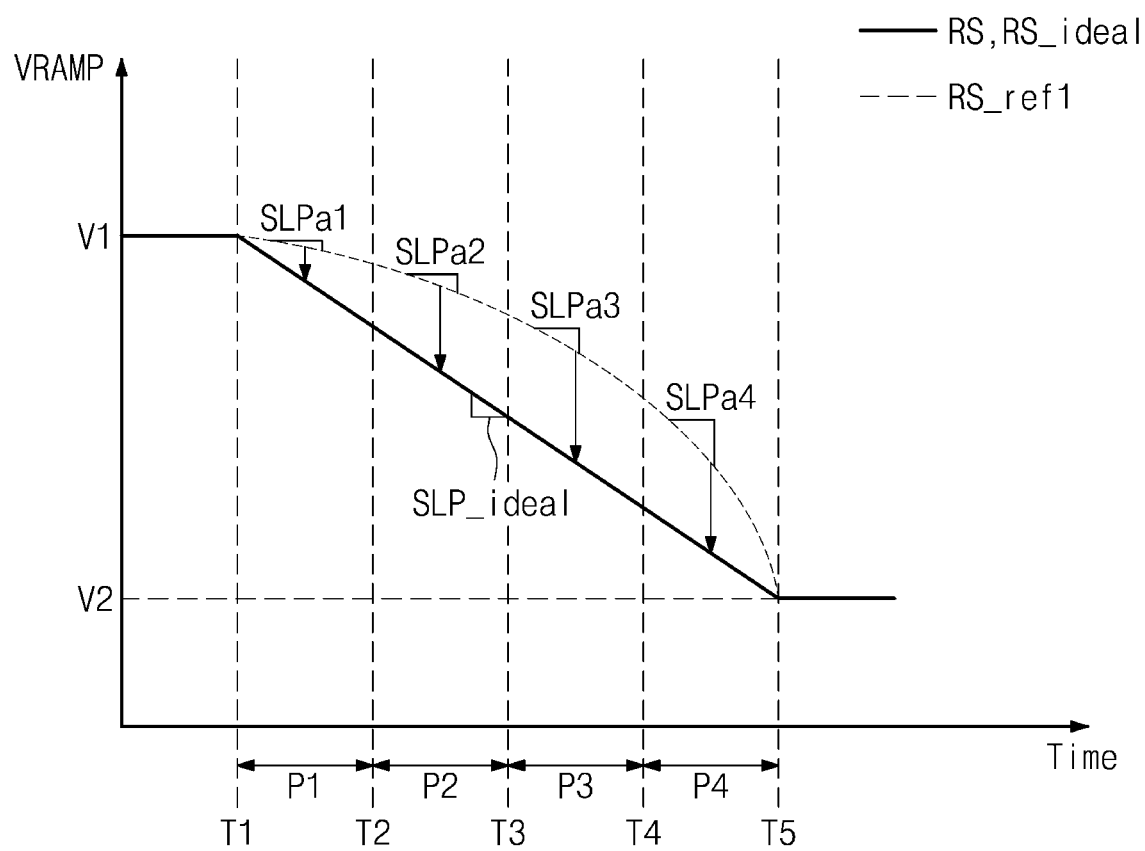
FIG. 9A is a diagram for describing a ramp signal calibration operation of a ramp signal generator according to an embodiment.

FIG. 9A is a graph for describing a ramp signal calibration operation of a ramp signal generator according to an embodiment. In FIG. 9A, a horizontal axis represents time, and a vertical axis represents a voltage level. Referring to FIG. 9A, a solid line indicates a waveform of a target ramp signal. FIG. 9A will be described with reference to FIG. 7.

According to an embodiment, the ramp signal generator 1400 may generate the output ramp signal RS whose voltage changes from the first value V1 to the second value V2, by sequentially turning off the plurality of unit current sources UCC1 to UCCN during an operation period from T1 to T5. The output ramp signal RS may be generated based on magnitudes of the unit currents I1 to IN output from the plurality of unit current sources UCC1 to UCCN.

Referring to FIGS. 7 and 9A, the ramp signal generator 1400 may include the first to fourth unit current source arrays SA1 to SA4. In this case, the operation period of the ramp signal generator 1400 may include first to fourth sub-operation periods P1 to P4. The first to fourth unit current source arrays SA1 to SA4 may receive the first to fourth unit current control signals UC1 to UC4.

For example, the first unit current source array SA1 may receive the first unit current control signal UC1. That is, a plurality of unit current sources included in the first unit current source array SA1 may receive the first unit current control signal UC1. The ramp signal generator 1400 may generate the ramp signal RS by activating only the first to M-th sub-ramp control signals (e.g., SUB1_1 to SUB1_M) among the first to K-th sub-ramp control signals (e.g., SUB1_1 to SUB1_K) included in each of the first to fourth unit current control signals UC1 to UC4. In this case, a magnitude "I" of each unit current may correspond to a sum of first to M-th sub-unit currents. In this case, the ramp signal may be referred to as a "first reference ramp signal RS_ref1". In FIG. 9A, a dashed line indicates a waveform of the first reference ramp signal RS_ref1.

FIG. 9B is a table for describing a graph of FIG. 9A. Referring to FIG. 9B, the ramp signal generator 1400 may selectively perform the calibration operation on the first reference ramp signal RS_ref1 in the first to fourth sub-operation periods P1 to P4. As such, the ramp signal generator 1400 may generate the output ramp signal RS. The output ramp signal RS may be substantially the same signal as the target ramp signal RS_ideal.

In the first sub-operation period P1, an absolute value of a slope SLPa1 of the first reference ramp signal RS_ref1 may be smaller than an absolute value of a slope SLP_ideal of the target ramp signal. This may mean that an integral non-linearity INL of the first reference ramp signal RS_ref1 has a value greater than "0". In this case, the ramp signal generator 1400 may perform the ramp signal calibration operation.

In the ramp signal calibration operation, the first to K-th sub-ramp control signals SUB1_1 to SUB1_K included in the first unit current control signal UC1 may be activated. In this case, the unit current that each of the plurality of unit current sources included in the first unit current source array SA1 outputs may correspond to a sum of first to K-th sub-unit currents. That is, the ramp signal generator 1400 may increase the magnitude of the unit current output from each of the unit current sources included in the first unit current source array SA1. As such, during the first sub-operation period P1, when the unit current sources included in the first unit current source array SA1 are sequentially turned off, a decrement of the voltage level of the output ramp signal RS may increase compared to a decrement of the voltage level of the reference ramp signal RS_ref. Accordingly, during the first sub-operation period P1, the absolute value of the slope of the output ramp signal RS may be greater than the absolute value of the slope SLPa1 of the first reference ramp signal RS_ref1. In this case, the ramp signal generator 1400 may control the slope of the output ramp signal RS so as to be substantially identical to the slope of the target ramp signal RS_ideal.

In the second sub-operation period P2, an absolute value of a slope SLPa2 of the first reference ramp signal RS_ref1 may be smaller than the absolute value of the slope SLP_ideal of the target ramp signal. This may mean that the integral non-linearity INL of the first reference ramp signal RS_ref1 has a value greater than "0". In this case, the ramp signal generator 1400 may perform the ramp signal calibration operation.

In the ramp signal calibration operation, the first to K-th sub-ramp control signals SUB2_1 to SUB2_K included in the second unit current control signal UC2 may be activated, and thus, the unit current that each of the unit current sources included in the second unit current source array SA2 outputs may correspond to a sum of first to K-th sub-unit currents. That is, the ramp signal generator 1400 may increase the magnitude of the unit current output from each of the unit current sources included in the second unit current source array SA2. During the second sub-operation period P2, when the unit current sources included in the second unit current source array SA2 are sequentially turned off, a decrement of the voltage level of the output ramp signal RS may increase compared to a decrement of the voltage level of the reference ramp signal RS_ref. Accordingly, during the second sub-operation period P2, the absolute value of the slope of the output ramp signal RS may be greater than the absolute value of the slope SLPa2 of the first reference ramp signal RS_ref1. As a result, the ramp signal generator 1400 may control the slope of the output ramp signal RS so as to be substantially identical to the slope of the target ramp signal RS_ideal during the second sub-operation period P2.

In the third sub-operation period P3, an absolute value of a slope SLPa3 of the first reference ramp signal RS_ref1 may be identical to the absolute value of the slope SLP_ideal of the target ramp signal. This may mean that the integral non-linearity INL of the first reference ramp signal RS_ref1 has a value approximately equal to "0". In this case, the ramp signal generator 1400 may not perform the ramp signal calibration operation.

Accordingly, the first to M-th sub-ramp control signals SUB3_1 to SUB3_M included in the third unit current control signal UC3 may be activated. The unit current that each of the plurality of unit current sources included in the third unit current source array SA3 outputs may correspond to a sum of first to M-th sub-unit currents. That is, under control of the ramp signal generator 1400, the slope of the output ramp signal RS may be maintained to be identical to the slope of the first reference ramp signal RS_ref1 during the third sub-operation period P3.

In the fourth sub-operation period P4, an absolute value of a slope SLPa4 of the first reference ramp signal RS_ref1 may be greater than the absolute value of the slope SLP_ideal of the target ramp signal. This may mean that the integral non-linearity INL of the first reference ramp signal RS_ref1 has a value greater than "0". In this case, the ramp signal generator 1400 may perform the ramp signal calibration operation.

In the ramp signal calibration operation, the first to J-th sub-ramp control signals SUB4_1 to SUB4_J included in the fourth unit current control signal UC4 may be activated. In this case, the unit current that each of the plurality of unit current sources included in the fourth unit current source array SA4 outputs may correspond to a sum of first to J-th sub-unit currents. That is, the ramp signal generator 1400 may decrease the magnitude of the unit current output from each of the unit current sources included in the fourth unit current source array SA4. During the fourth sub-operation period P4, when the unit current sources included in the fourth unit current source array SA4 are sequentially turned off, a decrement of the voltage level of the output ramp signal RS may decrease compared to a decrement of the voltage level of the reference ramp signal RS_ref. In this case, during the fourth sub-operation period P4, the absolute value of the slope of the output ramp signal RS may be smaller than the absolute value of the slope SLPa4 of the first reference ramp signal RS_ref1. Accordingly, the ramp signal generator 1400 may control the slope of the output ramp signal RS so as to be substantially identical to the slope of the target ramp signal RS_ideal during the fourth sub-operation period P4.

According to an embodiment, for each sub-operation period, the number (e.g., J, M, or K) of sub-ramp control signals activated from among first to K-th sub-ramp control signals included in each of the unit current control signals UC1 to UC4 may be determined based on a voltage level difference and a slope difference of the first reference ramp signal RS_ref1 and the target ramp signal RS_ideal.

For example, each of the first to fourth unit current source arrays SA1 to SA4 may include two unit current sources, each of which may include five sub-unit current sources.

That is, the ramp signal generator 1400 may include a total of 40 sub-unit current sources. For example, from a first time point to a fifth time point, only first to third sub-ramp control signals among first to fifth sub-ramp control signals included in each of the first to fourth unit current control signals UC1 to UC4 may be activated.

The ramp signal generator 1400 may generate the first reference ramp signal RS_ref1 by sequentially turning off unit current sources. As the unit current sources are sequentially turned off, the number of sub-unit currents flowing to the ramp resistor RRAMP may sequentially decrease to 24, 21, 18, . . . , 0.

The ramp signal generator 1400 may calibrate the first reference ramp signal RS_ref1 to generate the output ramp signal RS. The first to fourth sub-ramp control signals among the first to fifth sub-ramp control signals included in each of the first and second unit current control signals UC1 and UC2 may be activated. In this case, in the first and second sub-operation periods P1 and P2, the slope of the output ramp signal RS may increase compared to the slope of the first reference ramp signal RS_ref1. In first and second sub-operation periods P1 and P2, as unit current sources included in the first and second unit current source arrays SA1 and SA2 are sequentially turned off, the number of sub-unit currents flowing to the ramp resistor RRAMP may sequentially decrease to 24, 20, . . . , 8.

The first to third sub-ramp control signals among the first to fifth sub-ramp control signals included in the third unit current control signal UC3 may be activated. In this case, in the third sub-operation period P3, the slope of the output ramp signal RS may be identical to the slope of the first reference ramp signal RS_ref1. As the unit current sources included in the third unit current source array SA3 are sequentially turned off, the number of sub-unit currents flowing to the ramp resistor RRAMP may sequentially decrease to 8, 5, . . . , 2.

Also, the first sub-ramp control signal among the first to fifth sub-ramp control signals included in the fourth unit current control signal UC4 may be activated. In this case, in the fourth sub-operation period P4, the absolute value of the slope of the output ramp signal RS may decrease compared the absolute value of the slope SLPa4 of the first reference ramp signal RS_ref1. As the unit current sources included in the fourth unit current source array SA4 are sequentially turned off, the number of sub-unit currents flowing to the ramp resistor RRAMP may sequentially decrease to 2, 1, . . . , 0. That is, through the ramp signal calibration operation, the ramp signal generator 1400 may increase or decrease the slope of the ramp signal for each sub-operation period. Accordingly, the ramp signal generator 1400 may generate the output ramp signal RS that is substantially identical to the target ramp signal.

As described above, the ramp signal generator 1400 according to the present disclosure may perform bidirectional calibration with respect to the slope of the output ramp signal RS for each sub-operation period. That is, in a sub-operation period in which there is a need to increase a slope, a magnitude of a unit current that a turned-off unit current source outputs may be increased; in a sub-operation period in which there is a need to decrease a slope, a magnitude of a unit current that a turned-off unit current source outputs may be decreased. Accordingly, the absolute value of the slope of the output ramp signal RS may be substantially identical to the absolute value of the target ramp slope SLP_ideal.

Also, the ramp signal generator 1400 may selectively perform the calibration operation on the ramp signal RS only in a sub-operation period(s) requiring the calibration operation from among a plurality of sub-operation periods. According to the above description, the ramp signal generator 1400 may output the ramp signal RS with improved linearity.

Figure 10A:
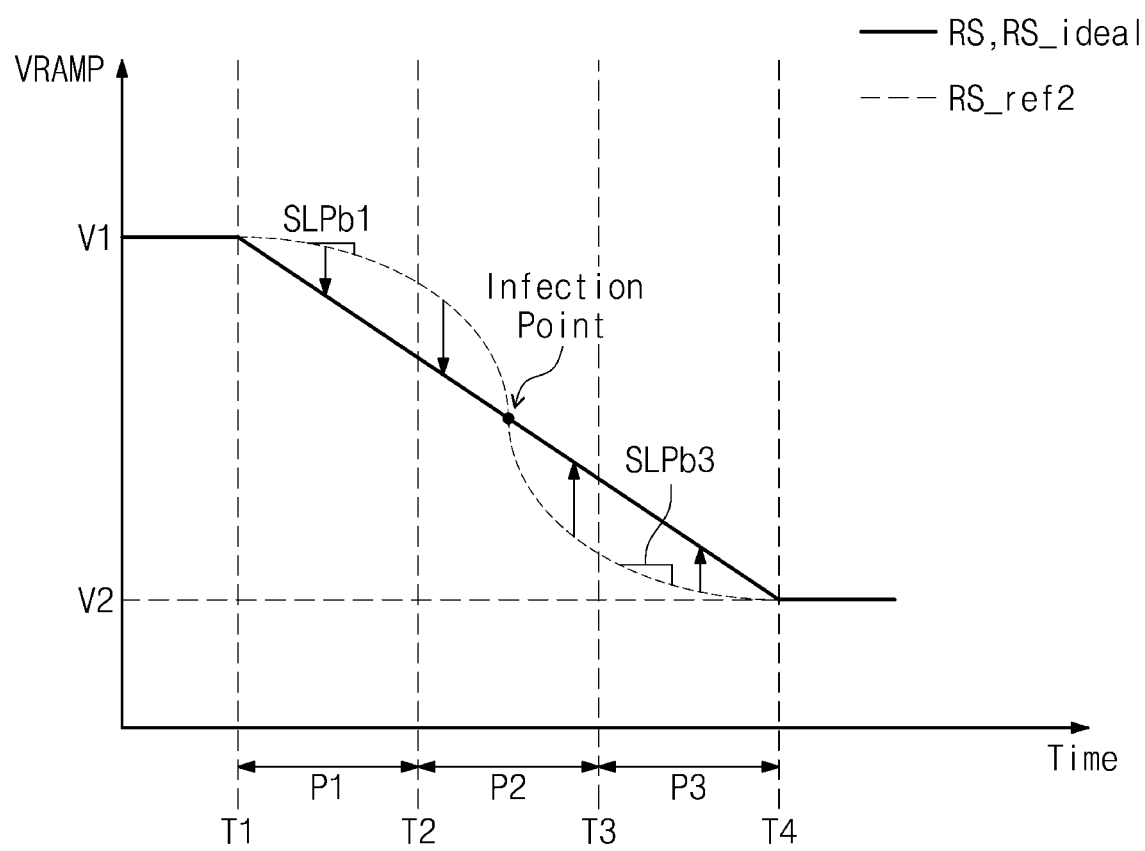
FIG. 10A is a graph for describing a ramp signal calibration operation of a ramp signal generator according to an embodiment.

FIG. 10A is a graph for describing a ramp signal calibration operation of a ramp signal generator according to an embodiment. In FIG. 10A, a horizontal axis represents time, and a vertical axis represents a voltage level of a ramp signal. Referring to FIG. 10A, a solid line indicates a waveform of a target ramp signal. FIG. 10A will be described with reference to FIG. 7.

Referring to FIGS. 7 and 10A, the ramp signal generator 1400 may include the first to third unit current source arrays SA1 to SA3. In this case, the operation period of the ramp signal generator 1400 may include first to third sub-operation periods P1 to P3. A second reference ramp signal RS_ref2 shown by a dashed line may refer to a signal that is generated when only first to M-th sub-ramp control signals (e.g., SUB1_1 to SUB1_M) are activated among the first to K-th sub-ramp control signals (e.g., SUB1_1 to SUB1_K) included in each of the first to third unit current control signals UC1 to UC3. In this case, a magnitude "I" of each unit current may correspond to a sum of first to M-th sub-unit currents.

FIG. 10B is a table for describing a graph of FIG. 10A. Referring to FIG. 10B, the ramp signal generator 1400 may generate the output ramp signal RS by selectively performing the calibration operation on the second reference ramp signal RS_ref2 in the first to third sub-operation periods P1 to P3. As such, the output ramp signal RS may be substantially identical to the target ramp signal RS_ideal.

In the first sub-operation period P1, an absolute value of a slope SLPb1 of the second reference ramp signal RS_ref2 may be smaller than the absolute value of the slope SLP_ideal of the target ramp signal RS_ideal. This may mean that the integral non-linearity INL of the second reference ramp signal RS_ref2 has a value greater than "0". In this case, the ramp signal generator 1400 may perform the ramp signal calibration operation.

In the ramp signal calibration operation, the first to K-th sub-ramp control signals, for example, SUB1_1 to SUB1_K included in the first unit current control signal UC1 may be activated. In this case, the unit current that each of the plurality of unit current sources included in the first unit current source array SA1 outputs may correspond to a sum of first to K-th sub-unit currents. That is, the ramp signal generator 1400 may increase the magnitude of the unit current output from each of the unit current sources included in the first unit current source array SAL During the first sub-operation period P1, a decrement of the voltage level of the ramp signal RS may increase when the unit current source is turned off. Accordingly, the ramp signal generator 1400 may increase the slope of the output ramp signal RS during the first sub-operation period P1. That is, in the first sub-operation period P1, the slope of the output ramp signal RS may be substantially identical to the slope of the target ramp signal RS_ideal.

In the second sub-operation period P2, a total of change amounts of the slope of the second reference ramp signal RS_ref2 may be "0". In this regard, in the second sub-operation period P2, the waveform of the second reference ramp signal RS_ref2 may include an infection point. This may mean that the integral non-linearity INL of the first reference ramp signal RS_ref2 has a value approximately equal to "0". In this case, the ramp signal generator 1400 may not perform the ramp signal calibration operation.

Accordingly, only the first to M-th sub-ramp control signals SUB2_1 to SUB2_M included in the second unit current control signal UC2 may be activated. That is, the unit current that each of the plurality of unit current sources included in the second unit current source array SA2 outputs may correspond to a sum of first to M-th sub-unit currents.

In the third sub-operation period P3, an absolute value of a slope SLPb3 of the second reference ramp signal RS_ref2 may be smaller than the absolute value of the slope SLP_ideal of the target ramp signal. This may mean that the integral non-linearity INL of the ramp signal RS has a value greater than "0". In this case, the ramp signal generator 1400 may perform the ramp signal calibration operation.

In the ramp signal calibration operation, the first to K-th sub-ramp control signals (e.g., SUB3_1 to SUB3_K) included in the third unit current control signal UC3 may be activated, and thus, the unit current that each of the plurality of unit current sources included in the third unit current source array SA3 outputs may correspond to a sum of first to K-th sub-unit currents. That is, the ramp signal generator 1400 may increase the magnitude of the unit current output from each of the unit current sources included in the third unit current source array SA3. During the third sub-operation period P3, a decrement of the voltage level of the ramp signal RS may increase when the unit current source is turned off. Accordingly, the absolute value of the slope of the output ramp signal RS may become greater than the absolute value of the slope of the second reference ramp signal RS_ref2. That is, the ramp signal generator 1400 may control the slope of the output ramp signal RS so as to be substantially identical to the slope of the target ramp signal RS_ideal during the third sub-operation period P3.

Figure 11A:
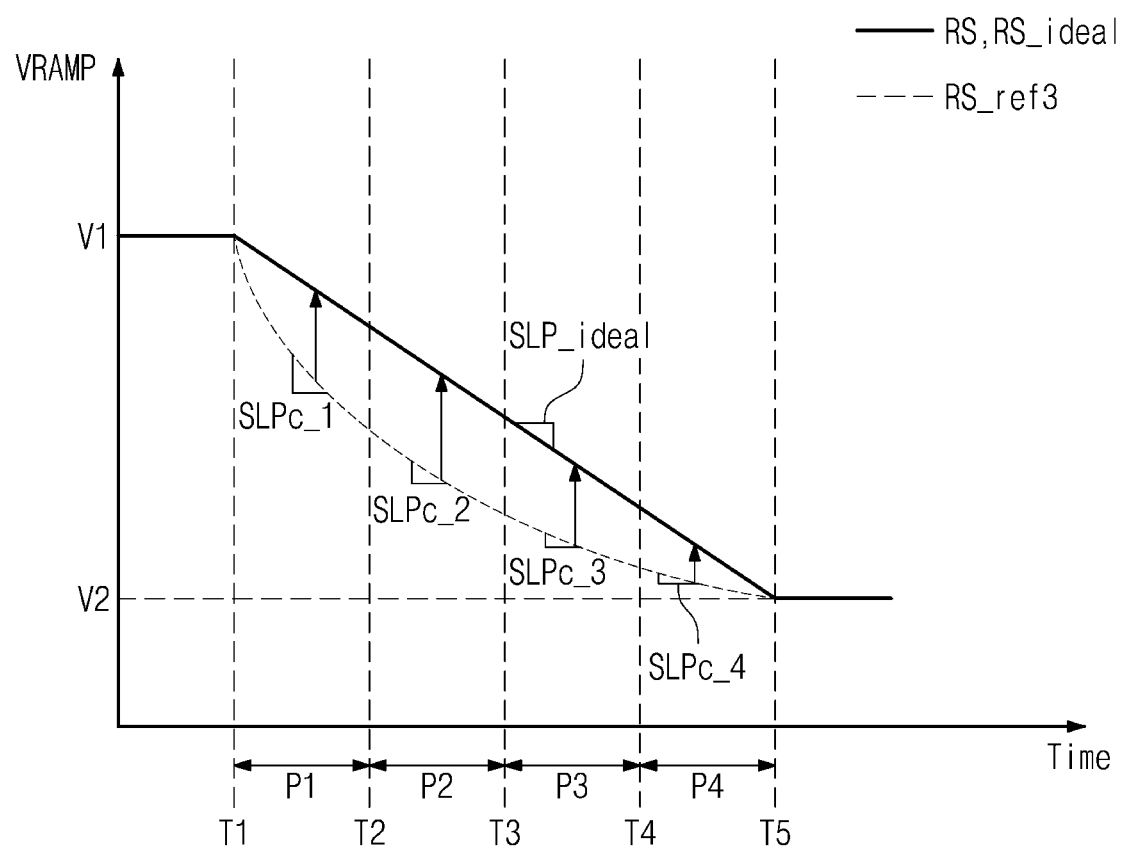
FIG. 11A is a graph for describing a ramp signal calibration operation of a ramp signal generator according to an embodiment.

FIG. 11A is a graph for describing a ramp signal calibration operation of a ramp signal generator according to an embodiment. In FIG. 11A, a horizontal axis represents time, and a vertical axis represents a voltage level of a ramp signal. Referring to FIG. 11A, a solid line indicates a waveform of a target ramp signal. FIG. 11A will be described with reference to FIG. 7.

Referring to FIGS. 7 and 11A, the ramp signal generator 1400 may include the first to fourth unit current source arrays SA1 to SA4. In this case, the operation period of the ramp signal generator 1400 may include first to fourth sub-operation periods P1 to P4. The first to fourth unit current source arrays SA1 to SA4 may respectively receive the first to fourth unit current control signals UC1 to UC4.

In FIG. 11A, a third reference ramp signal RS_ref3 shown by a dashed line may refer to a signal that is generated when only first to M-th sub-ramp control signals (e.g., SUB1_1 to SUB1_M) are activated among the first to K-th sub-ramp control signals (e.g., SUB1_1 to SUB1_K) included in each of the first to fourth unit current control signals UC1 to UC4. In this case, a magnitude "I" of a unit current may correspond to a sum of first to M-th sub-unit currents.

FIG. 11B is a table for describing a graph of FIG. 11A. Referring to FIGS. 11A and 11B, the ramp signal generator 1400 may generate the output ramp signal RS by selectively performing the calibration operation on the third reference ramp signal RS_ref3 in the first to fourth sub-operation periods P1 to P4. As such, the output ramp signal RS may have a slope that is substantially identical to the slope of the target ramp signal RS_ideal.

In the first sub-operation period P1, an absolute value of a slope SLPc1 of the third reference ramp signal RS_ref3 may be greater than the absolute value of the slope SLP_ideal of the target ramp signal. This may mean that the integral non-linearity INL of the ramp signal RS has a value greater than "0". In this case, the ramp signal generator 1400 may perform the ramp signal calibration operation.

In the ramp signal calibration operation, only first to J-th sub-ramp control signals (e.g., SUB1_1 to SUB1_J) included in the first unit current control signal UC1 may be activated. In this case, the unit current that each of the plurality of unit current sources included in the first unit current source array SA1 outputs may correspond to a sum of first to J-th sub-unit currents. That is, the ramp signal generator 1400 may decrease the magnitude of the unit current output from each of the unit current sources included in the first unit current source array SAL During the first sub-operation period P1, a decrement of the voltage level of the ramp signal RS may decrease when the unit current source is turned off. Accordingly, the ramp signal generator 1400 may control the slope of the output ramp signal RS so as to be substantially identical to the slope of the target ramp signal RS_ideal during the first sub-operation period P1.

In the second sub-operation period P2, an absolute value of a slope SLPc2 of the third reference ramp signal RS_ref3 may be identical to the absolute value of the slope SLP_ideal of the target ramp signal. This may mean that the integral non-linearity INL of the first reference ramp signal RS_ref3 has a value approximately equal to "0". In this case, the ramp signal generator 1400 may not perform the ramp signal calibration operation.

Accordingly, the first to M-th sub-ramp control signals SUB2_1 to SUB2_M included in the second unit current control signal UC2 may maintain an active state. In this case, the unit current that each of the plurality of unit current sources included in the second unit current source array SA2 outputs may be maintained at a sum of first to M-th sub-unit currents.

In the third sub-operation period P3, an absolute value of a slope SLPc3 of the third reference ramp signal RS_ref3 may be smaller than the absolute value of the slope SLP_ideal of the target ramp signal RS_ideal. This may mean that the integral non-linearity INL of the third reference ramp signal RS_ref3 has a value greater than "0". In this case, the ramp signal generator 1400 may perform the ramp signal calibration operation.

In the ramp signal calibration operation, the first to K-th sub-ramp control signals SUB3_1 to SUB3_K included in the third unit current control signal US3 may be activated, and thus, the unit current that each of the plurality of unit current sources included in the third unit current source array SA3 outputs may correspond to a sum of first to K-th sub-unit currents. That is, the ramp signal generator 1400 may increase the magnitude of the unit current output from each of the unit current sources included in the third unit current source array SA3. During the third sub-operation period P3, a decrement of the voltage level of the ramp signal RS may increase when the unit current source is turned off. Accordingly, the ramp signal generator 1400 may control the slope of the output ramp signal RS so as to be substantially identical to the slope of the target ramp signal RS_ideal during the third sub-operation period P3.

In the fourth sub-operation period P4, an absolute value of a slope SLPc4 of the third reference ramp signal RS_ref3 may be smaller than the absolute value of the slope SLP_ideal of the target ramp signal. This may mean that the integral non-linearity INL of the ramp signal RS has a value greater than "0". In this case, the ramp signal generator 1400 may perform the ramp signal calibration operation.

In the ramp signal calibration operation, the first to K-th sub-ramp control signals SUB4_1 to SUB4_K included in the fourth unit current control signal UC4 may be activated, and thus, the unit current that each of the plurality of unit current sources included in the fourth unit current source array SA4 outputs may correspond to a sum of first to K-th sub-unit currents. That is, the ramp signal generator 1400 may increase the magnitude of the unit current output from each of the unit current sources included in the fourth unit current source array SA4. During the fourth sub-operation period P4, a decrement of the voltage level of the ramp signal RS may increase when the unit current source is turned off. Accordingly, the ramp signal generator 1400 may increase the slope of the output ramp signal RS during the fourth sub-operation period P4. In this case, the ramp signal generator 1400 may control the slope of the output ramp signal RS so as to be substantially identical to the slope of the target ramp signal RS_ideal.

The ramp signal generator 1400 according to an embodiment may calibrate a ramp signal without limitation on the patterns of the first to third reference ramp signals RS_ref1 to RS_ref3 illustrated in FIGS. 9A, 10A, and 11A. That is, the ramp signal generator 1400 may selectively perform the bidirectional calibration with respect to the ramp signal in a plurality of sub-operation periods, regardless of a non-linear pattern of the ramp signal. Accordingly, the ramp signal generator 1400 may generate the output ramp signal that is substantially identical to the target ramp signal.

In an embodiment, the image sensor 1000 may include two or more ramp signal generators 1400, which may for example support high dynamic range (HDR) and fast readout functions. In the case where the image sensor 1000 includes two or more ramp signal generators 1400, as shown in FIG. 4, patterns of ramp signal that the ramp signal generators 1400 respectively output may be different from each other. As such, the probability that an error occurs in the operation the ADC 1500 may increase.

In the case where the image sensor 1000 includes two or more ramp signal generators 1400 according to an embodiment, unlike the ramp signal generator of FIG. 3, each of the ramp signal generators 1400 may improve the linearity of the ramp signal through the calibration of the output ramp signal. That is, even though patterns of ramp signals that the ramp signal generators 1400 respectively output are different, the image sensor 1000 according to an embodiment may reduce the probability that an error occurs in the operation of the ADC 1500, through the calibration of the ramp signals.

Figure 12:
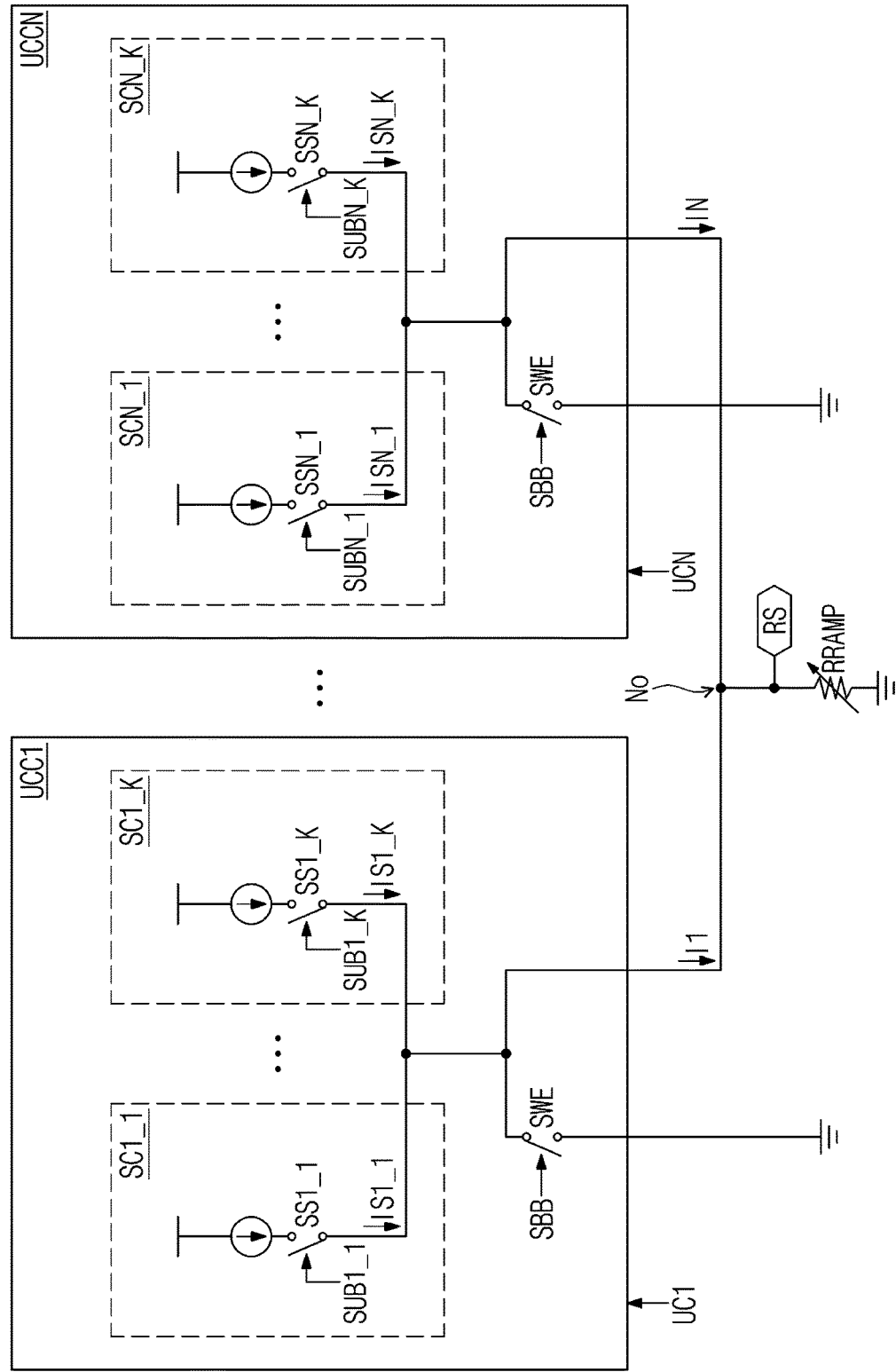
FIG. 12 is a diagram illustrating unit current sources according to another embodiment.

FIG. 12 is a diagram illustrating unit current sources according to another embodiment. For convenience of description, additional description associated with the components described above will be omitted to avoid redundancy. Referring to FIG. 12, the unit current sources UCC1 to UCCN included in the ramp signal generator 1400 may respectively receive the ramp control signals US1 to USN. Like the unit current sources of FIG. 5, each of the unit current sources UCC1 to UCCN may include a plurality of sub-unit current sources (e.g., SC1_1 to SCN_K) and the ramp end switch SWE. Also, like the sub-unit current sources of FIG. 5, each of the plurality of sub-unit current sources may include first and second PMOS transistors. However, unlike the unit current sources of FIG. 5, each of the unit current sources UCC1 to UCCN may not include a ramp switch (e.g., SW1).

Each of the ramp control signals US1 to USN may include the first to K-th sub-ramp control signals SUB1_1 to SUB1_K. For example, the first ramp control signal US1 may include the first to K-th sub-ramp control signals SUB1_1 to SUB1_K. For example, the N-th ramp control signal USN may include the first to K-th sub-ramp control signals SUBN_1 to SUBN_K. In this case, the total number of sub-ramp control signals may be "N×K". The magnitude of each of the unit currents I1 to IN may be independently controlled based on the number of sub-ramp control signals activated from among sub-ramp control signals included in each of the first to N-th ramp control signals US1 to USN.

For example, when all the first to K-th sub-ramp control signals SUB1_1 to SUB1_K included in the first ramp control signal US1 are deactivated, the first unit current source UCC1 may be turned off. For example, when the first unit current source UCC1 is in the turn-on state, as the number of sub-ramp control signals activated from among the sub-ramp control signals included in the first ramp control signal US1 is controlled, a decrement of a magnitude of a current flowing to a ramp resistor may be controlled when the first unit current source UCC1 is turned off.

For example, when each unit current source is in the turn-on state, the number of sub-ramp control signals activated for each unit current source may be determined based on a difference between the target ramp signal and the reference ramp signal. The ramp signal generator 1400 may generate the output ramp signal based on the number of sub-ramp control signals activated for each unit current source. In this case, the output ramp signal may be substantially the same signal as the target ramp signal.

For example, a first unit current source may output a first unit current source in a first time period. In this case, in the first time period, the magnitude of the first unit current may be determined based on the number of sub-ramp control signals activated from among the first to K-th sub-ramp control signals SUB1_1 to SUB1_K included in the first ramp control signal US1. In the first time period, the number of activated sub-ramp control signals may be determined based on a magnitude of a unit current for outputting the target ramp signal. That is, the magnitude of the first unit current may be controlled to be identical to the magnitude of the unit current for outputting the target ramp signal, based on the number of sub-ramp control signals activated from among the first to K-th sub-ramp control signals SUB1_1 to SUB1_K included in the first ramp control signal US1.

Figure 13:
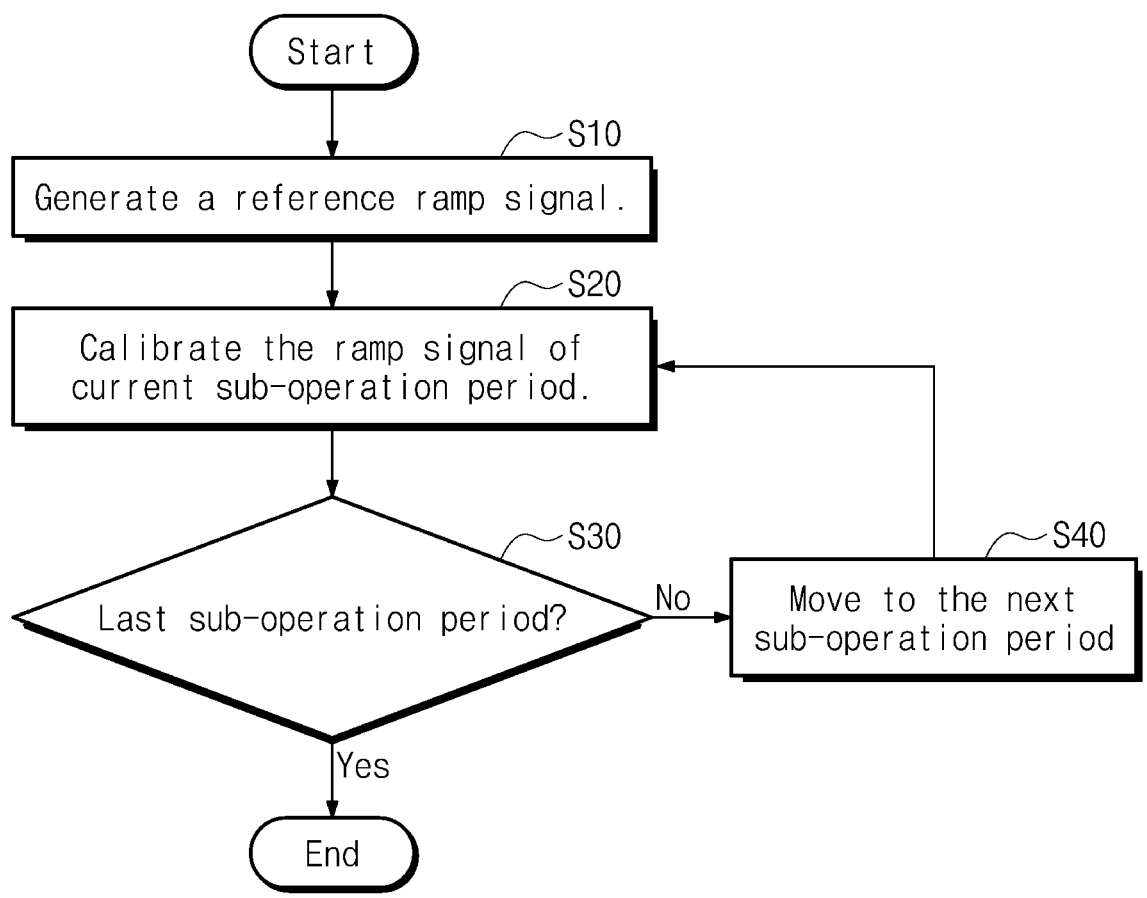
FIG. 13 is a flowchart illustrating an operating method of an image sensor including a ramp signal generator according to an embodiment.

FIG. 13 is a flowchart illustrating an operating method of an image sensor including a ramp signal generator according to an embodiment. Referring to FIGS. 1, 2, 5, and 8, in operation S10, the image sensor 1000 may generate the ramp signal RS by sequentially turning off the first to N-th unit current sources UCC1 to UCCN included in the ramp signal generator 1400. In this case, when each unit current source is in the turn-on state, only first to M-th sub-ramp control signals among first to K-th sub-ramp control signals may be activated. As such, the ramp signal generator 1400 may generate a reference ramp signal.

In operation S20, the image sensor 1000 may calibrate the reference ramp signal of a current sub-operation period to be substantially identical to the target ramp signal. The ramp signal calibration operation will be described in detail with reference to FIG. 14.

In operation S30, the image sensor 1000 may determine whether the current sub-operation period is the last sub-operation period of the ramp signal. When it is determined that the current sub-operation period is the last sub-operation period of the ramp signal, the image sensor 1000 may terminate the ramp signal calibration operation.

When it is determined that the current sub-operation period is not the last sub-operation period of the ramp signal, the image sensor 1000 may move to a next sub-operation period (S40). In the next sub-operation period, the image sensor 1000 may perform operation S20 to operation S40.

Figure 14:
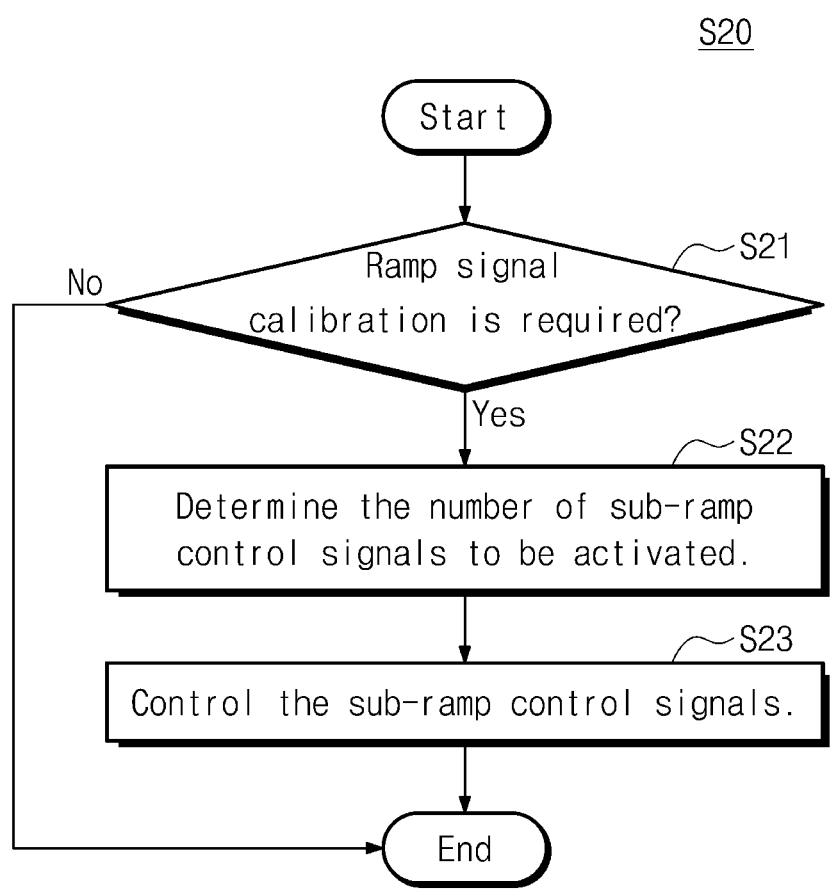
FIG. 14 is a flowchart illustrating a ramp signal calibration operation of FIG. 13 in detail.

FIG. 14 is a flowchart illustrating a ramp signal calibration operation of FIG. 13 in detail. In operation S21, in the current sub-operation period, the image sensor 1000 may determine whether there is a need to perform the ramp signal calibration operation. When an absolute value |SLP| of a slope of the reference ramp signal is equal to an absolute value |SLP_ideal| of a slope of the target ramp signal, the image sensor 1000 may terminate the ramp signal calibration in operation S20. Also, in the current sub-operation period, when a total of change amounts of the slope of the reference ramp signal is "0", the image sensor 1000 may terminate the ramp signal calibration in operation S20.

When the absolute value |SLP| of the slope of the ramp signal is not equal to the absolute value |SLP_ideal| of the slope of the target ramp signal, in operation S22, the image sensor 1000 may determine the number of sub-ramp control signals to be activated. In this case, the number of sub-ramp control signals to be activated may be determined based on a difference between the absolute value |SLP| of the slope of the reference ramp signal and the absolute value |SLP_ideal| of the slope of the target ramp signal and a voltage level difference of the reference ramp signal and the target ramp signal.

In operation S23, the image sensor 1000 may control the ramp signal generator 1400. That is, the image sensor 1000 may activate sub-ramp control signals based on the number determined in operation S22. As such, sub-unit current sources may be selected and turned from the first to K-th sub-unit current sources included in each unit current source being in the turn-on state, as much as the number determined in operation S22. As such, the image sensor 1000 may calibrate the slope of the ramp signal by adjusting the magnitude of the unit current in the current sub-operation period.

According to an embodiment, the image sensor 1000 may operate during a pre-test period and a ramp generation period. During the pre-test period, for each unit current source, when each of the unit current sources outputs a unit current, the number of sub-lamp control signals to be activated may be determined.

The number of sub-ramp control signals to be activated may be determined based on a result of comparing the reference ramp signal and the target ramp signal. In the ramp generation period, the image sensor 1000 may generate the ramp signal RS. In this case, the image sensor 1000 may generate the ramp signal RS based on the number of sub-ramp control signals to be activated that is in advance determined in the pre-test period.

According to embodiments, a ramp signal generator may calibrate a slope of a non-linear section among operation sections of a ramp signal. In this case, the ramp signal generator may calibrate the slope of the non-linear section bi-directionally so as to increase or decrease. Also, with regard to sections requiring linearity calibration from among sections of the ramp signal, slope calibration may be made for each of the sections requiring linearity calibration. Accordingly, a ramp signal generator providing a ramp signal with the linearity, an operating method thereof, and an image sensor device including the same are provided.

While aspects of embodiments have been particularly shown and described, it will be understood that various changes in form and details may be made therein without departing from the spirit and scope of the following claims.

What is claimed is:

1. A ramp signal generator comprising:
a first unit current source comprising a plurality of first sub-unit current sources connected to a first unit current output node, and configured to output a first unit current during a first time period;
a first ramp switch connected between the first unit current output node and an output node;
a second unit current source comprising a plurality of second sub-unit current sources connected to a second unit current output node, and configured to output a second unit current during a second time period; and
a second ramp switch connected between the second unit current output node and the output node,
wherein the plurality of first sub-unit current sources are configured to operate according to a plurality of first sub-ramp control signals, respectively,
wherein the plurality of second sub-unit current sources are configured to operate according to a plurality of second sub-ramp control signals, respectively, and
wherein n first sub-ramp control signals among the plurality of first sub-ramp control signals are activated, and m sub-ramp control signals among the plurality of second sub-ramp control signals are activated, n and m being different natural numbers that are determined based on a difference between a reference ramp signal and a target ramp signal.

2. The ramp signal generator of claim 1, wherein n corresponds to a magnitude of the first unit current, and
wherein m corresponds to a magnitude of the second unit current.

3. The ramp signal generator of claim 1, wherein the ramp signal generator is configured to generate a ramp signal having a voltage level that changes from a first value to a second value;
wherein the reference ramp signal is generated when k first sub-ramp control signals among the plurality of first sub-ramp control signals and k second sub-ramp control signals among the plurality of second sub-ramp control signals are activated, k being a natural number, and
wherein the target ramp signal has a voltage level that changes linearly from the first value to the second value.

4. The ramp signal generator of claim 3, wherein the ramp signal generator comprises a first unit current source array and a second unit current source array,
wherein the first unit current source array comprises the first unit current source, and the second unit current source array comprises the second unit current source,
wherein the first unit current source array is configured to receive the plurality of first sub-ramp control signals, and
wherein the second unit current source array is configured to receive the plurality of second sub-ramp control signals.

5. The ramp signal generator of claim 4, further comprising a bias circuit configured to output a first bias signal and a second bias signal to the plurality of first sub-unit current sources and the plurality of second sub-unit current sources.

6. The ramp signal generator of claim 5, wherein each of the plurality of first sub-unit current sources comprises:
a first p-channel metal oxide semiconductor (PMOS) transistor, a second PMOS transistor, and a first switching element connected in series between a power node and the first unit current output node,
wherein the first PMOS transistor operates based on the first bias signal,
wherein the second PMOS transistor operates based on the second bias signal,
wherein the first switching element is turned on or turned off according to a first sub-ramp control signal, from among the plurality of first sub-ramp control signals, corresponding to each of the plurality of first sub-unit current sources,
wherein the ramp signal is formed at the output node, and
wherein the first ramp switch is turned on or turned off according to a first ramp control signal.

7. The ramp signal generator of claim 6, wherein the ramp signal generator further comprises:
a variable resistor connected between the output node at which the ramp signal is formed and a ground node, and
wherein a slope of the ramp signal is proportional to a magnitude of the variable resistor.

8. The ramp signal generator of claim 7, wherein the first unit current source further comprises a second switching element connected between the first unit current output node and the ground node, and
wherein the second switching element is turned on or turned off based on a ramp end signal.

9. The ramp signal generator of claim 3, wherein, during the first time period, an absolute value of a slope of the target ramp signal is greater than an absolute value of a slope of the reference ramp signal, and
wherein the n is greater thank.

10. The ramp signal generator of claim 9, wherein, during the second time period, the absolute value of the slope of the target ramp signal is smaller than the absolute value of the slope of the reference ramp signal, and
wherein the m is smaller thank.

11. The ramp signal generator of claim 10, further comprising:
a third unit current source comprising a plurality of third sub-unit current sources, and configured to output a third unit current during a third time period,
wherein the plurality of third sub-unit current sources are configured to operate according to a plurality of third sub-ramp control signals, respectively,
wherein k third sub-ramp control signals among the plurality of third sub-ramp control signals are activated,
wherein the reference ramp signal is generated when the k first sub-ramp control signals, the k second sub-ramp control signals and the k third sub-ramp control signals among the plurality of third sub-ramp control signals are activated, and
wherein, during the third time period, the absolute value of the slope of the target ramp signal is equal to the absolute value of the slope of the reference ramp signal.

12. The ramp signal generator of claim 1, wherein n and m are determined based on the difference between the reference ramp signal and the target ramp signal in a pre-test section.

13. An image sensor device comprising:
a pixel array configured to output pixel signals corresponding to an image;
a ramp signal generator configured to output a ramp signal;
an analog-to-digital converter configured to receive the pixel signals from the pixel array and to receive the ramp signal from the ramp signal generator; and a sensor controller configured to control the ramp signal generator, and to generate a plurality of first sub-ramp control signals and a plurality of second sub-ramp control signals, wherein the ramp signal generator comprises:
- a first unit current source comprising a plurality of first sub-unit current sources, and configured to output a first unit current during a first time period; and
- a second unit current source comprising a plurality of second sub-unit current sources, and configured to output a second unit current during a second time period, wherein the plurality of first sub-unit current sources are configured to operate according to the plurality of first sub-ramp control signals, respectively, wherein the plurality of second sub-unit current sources are configured to operate according to the plurality of second sub-ramp control signals, respectively, and wherein n first sub-ramp control signals among the plurality of first sub-ramp control signals are activated, and m sub-ramp control signals among the plurality of second sub-ramp control signals are activated, n and m being different natural numbers.

14. The image sensor device of claim 13, wherein the ramp signal generator is configured to control a voltage level of the ramp signal to change from a first value to a second value;

wherein n and m are determined based on a difference between a reference ramp signal and a target ramp signal, wherein the reference ramp signal is generated when k first sub-ramp control signals among the plurality of first sub-ramp control signals and k second sub-ramp control signals among the plurality of second sub-ramp control signals are activated, k being a natural number, and wherein the target ramp signal has a voltage level that changes linearly from the first value to the second value.

15. The image sensor device of claim 14, wherein, during the first time period, an absolute value of a slope of the target ramp signal is greater than an absolute value of a slope of the reference ramp signal, and wherein the n is greater than k.

16. The image sensor device of claim 15, wherein, during the second time period, the absolute value of the slope of the target ramp signal is smaller than the absolute value of the slope of the reference ramp signal, and wherein the m is smaller than k.

17. The image sensor device of claim 16, wherein the ramp signal generator further comprises:
- a third unit current source comprising a plurality of third sub-unit current sources, and configured to output a third unit current during a third time period, wherein the plurality of third sub-unit current sources are configured to operate according to a plurality of third sub-ramp control signals, respectively, wherein k third sub-ramp control signals among the plurality of third sub-ramp control signals are activated, wherein the reference ramp signal is generated when the k third sub-ramp control signals among the plurality of third sub-ramp control signals are further activated, and wherein, during the third time period, the absolute value of the slope of the target ramp signal is equal to the absolute value of the slope of the reference ramp signal.

18. The image sensor device of claim 13, wherein the ramp signal generator further comprises a bias circuit configured to output a first bias signal and a second bias signal to the plurality of first sub-unit current sources and the plurality of second sub-unit current sources.

19. The image sensor device of claim 18, wherein each of the plurality of first sub-unit current sources comprises:
- a first p-channel metal oxide semiconductor (PMOS) transistor, a second PMOS transistor, and a switching element connected in series between a power node of receiving a power supply voltage and an output node at which the ramp signal is formed; and
- a variable resistor connected between the output node at which the ramp signal is formed and a ground node, wherein the first PMOS transistor operates based on the first bias signal, wherein the second PMOS transistor operates based on the second bias signal, wherein the switching element is turned on or turned off according to a first sub-ramp control signal, from among the plurality of first sub-ramp control signals, corresponding to each of the plurality of first sub-unit current sources, and wherein a slope of the ramp signal is proportional to a magnitude of the variable resistor.

20. A ramp signal generator comprising:
a first unit current source configured to output a first unit current during a first time period; and
a second unit current source configured to output a second unit current during a second time period, wherein the ramp signal generator is configured to generate a ramp signal having a voltage level that changes from a first value to a second value, wherein a magnitude of the first unit current and a magnitude of the second unit current are different from each other, wherein the magnitude of the first unit current is identical to a magnitude of a unit current for generating a target ramp signal during the first time period, wherein the magnitude of the second unit current is identical to the magnitude of the unit current for generating the target ramp signal during the second time period, and wherein the target ramp signal has a voltage level that changes linearly from the first value to the second value.

* * * * *